US012328063B2

(12) United States Patent
Guo et al.

(10) Patent No.: US 12,328,063 B2
(45) Date of Patent: Jun. 10, 2025

(54) TOTEM POLE POWER FACTOR CORRECTION CIRCUIT

(71) Applicant: Delta Electronics (Shanghai) Co., Ltd., Shanghai (CN)

(72) Inventors: Yuesen Guo, Shanghai (CN); Kai Dong, Shanghai (CN)

(73) Assignee: Delta Electronics (Shanghai) Co., Ltd., Shanghai (CN)

(*) Notice: Subject to any disclaimer, the term of this patent is extended or adjusted under 35 U.S.C. 154(b) by 105 days.

(21) Appl. No.: 18/138,587

(22) Filed: Apr. 24, 2023

(65) Prior Publication Data

US 2023/0353046 A1    Nov. 2, 2023

(30) Foreign Application Priority Data

Apr. 29, 2022  (CN) .......................... 202210475921.8
Apr. 18, 2023  (CN) .......................... 202310417476.4

(51) Int. Cl.
*H02M 1/42*  (2007.01)

(52) U.S. Cl.
CPC ................................. *H02M 1/4233* (2013.01)

(58) Field of Classification Search
CPC .. H02M 1/4233; H02M 1/425; H02M 1/4258; H02M 1/4266; H02M 1/42; H02M 1/4208; H02M 1/4216; H02M 1/4225
See application file for complete search history.

(56) References Cited

U.S. PATENT DOCUMENTS

| | | | |
|---|---|---|---|
| 2011/0031941 A1* | 2/2011 | Green | H02M 1/4208 |
| | | | 323/205 |
| 2024/0014732 A1* | 1/2024 | Pohlmann | H02M 1/4233 |
| 2025/0015713 A1* | 1/2025 | Du | H02M 1/4233 |

FOREIGN PATENT DOCUMENTS

| | | |
|---|---|---|
| CN | 104852567 A | 8/2015 |
| CN | 108663558 B | 6/2020 |
| CN | 113783414 A | 12/2021 |
| CN | 114825899 A | 7/2022 |
| WO | 2020232994 A1 | 11/2020 |
| WO | 2022032537 A1 | 2/2022 |

* cited by examiner

*Primary Examiner* — Nguyen Tran
(74) *Attorney, Agent, or Firm* — KIRTON McCONKIE; Evan R. Witt

(57) ABSTRACT

A totem pole power factor correction circuit is provided. The detection module in the totem pole power factor correction circuit includes a detection resistor and a detection circuit. If the output voltage outputted by the detection circuit is greater than or equal to an upper limit voltage threshold or lower than or equal to a lower limit voltage threshold, at least a third switch and a fourth switch are turned off under control of the control unit. Consequently, the totem pole power factor correction circuit can be protected. Under this circumstance, the protecting measure can be taken immediately. Consequently, the possibility of causing damage of the totem pole power factor correction circuit will be minimized. In other words, the performance of the totem pole power factor correction circuit is enhanced.

13 Claims, 16 Drawing Sheets

TOTEM POLE POWER FACTOR CORRECTION CIRCUIT

CROSS-REFERENCE TO RELATED APPLICATION

This application claims priorities to China Patent Application No. 202210475921.8, filed on Apr. 29, 2022 and China Patent Application No. 202310417476.4, filed on Apr. 18, 2023, the entire contents of which are incorporated herein by reference for all purposes.

FIELD OF THE INVENTION

The present disclosure relates to a totem pole power factor correction circuit, and more particularly to a totem pole power factor correction circuit with a detection module.

BACKGROUND OF THE INVENTION

Generally, a conventional power factor correction (PFC) circuit includes many switches. In addition, since the reverse recovery loss of the conventional power factor correction circuit is high, it is difficult to increase its efficiency. In contrast, a totem pole power factor correction circuit includes fewer switches. In addition, the totem pole power factor correction circuit uses wide bandgap semiconductor devices as switches. Since the reverse recovery loss is reduced and the efficiency is enhanced, the manufactures pay much attention to the totem pole power factor correction circuit.

Generally, the totem pole power factor correction circuit includes a plurality of bypass diodes. When the totem pole power factor correction circuit is in the normal working state, the bypass diodes are in the off state. Consequently, the current from the input power source can evenly flow through a plurality of switches of the totem pole power factor correction circuit.

However, when the totem pole power factor correction circuit is in the abnormal state, for example, the switches are erroneously triggered or the polarity of the power supply is suddenly reversed because of unexpected situations (e.g., thunder) and the inconsistent control occurs due to time delay, the input power source connected with the bypass diodes is possibly in the short-circuited condition. Under this circumstance, the current from the input power source flows through a single switch of the totem pole power factor correction circuit only. In other words, the current flowing through the switch is too large. The large current may cause the damage of the totem pole power factor correction circuit.

Therefore, there is a need of providing an improved totem pole power factor correction circuit in order to overcome the drawbacks of the conventional technologies.

SUMMARY OF THE INVENTION

The present disclosure provides a totem pole power factor correction circuit. The circuitry topology of the totem pole power factor correction circuit is specially designed. Consequently, the totem pole power factor correction circuit is effectively protected, and the performance is enhanced.

In accordance with an aspect of present disclosure, a totem pole power factor correction circuit is provided. The totem pole power factor correction circuit is electrically coupled with an input power source and a load. The totem pole power factor correction circuit includes a first bridge arm, a second bridge arm, a third bridge arm, a first inductor, a detection module and a control unit. The first bridge arm includes a first bypass diode and a second bypass diode connected in series. A connection point between the first bypass diode and the second bypass diode is a first node. The second bridge arm is connected with the first bridge arm in parallel. The second bridge arm includes a first switch and a second switch connected in series. A connection point between the first switch and the second switch is a second node. The third bridge arm is connected with the first bridge arm in parallel. The third bridge arm includes a third switch and a fourth switch connected in series. A connection point between the third switch and the fourth switch is a third node. The third node is electrically connected with a second terminal of the input power source. The first inductor is electrically connected between a first terminal of the input power source and the second node. The detection module includes a detection resistor and a detection circuit. A first terminal of the detection resistor, the first node and a first terminal of the detection circuit are connected with each other. A second terminal of the detection resistor, the first terminal of the input power source and a second terminal of the detection circuit are connected with each other. A voltage difference between two terminals of the detection resistor is detected by the detection circuit and an output voltage is outputted from a third terminal of the detection circuit. The control unit is electrically coupled with a third terminal of the detection circuit, and controls the first switch, the second switch, the third switch and the fourth switch. When the control unit confirms that the output voltage outputted by the detection circuit is greater than or equal to an upper limit voltage threshold or the output voltage outputted by the detection circuit is smaller than or equal to a lower limit voltage threshold, at least the third switch and the fourth switch are turned off under control of the control unit.

In accordance with another aspect of present disclosure, a totem pole power factor correction circuit is provided. The totem pole power factor correction circuit is electrically coupled with an input power source and a load. The totem pole power factor correction circuit includes a first bridge arm, a second bridge arm, a third bridge arm, a first inductor, a detection module and a control unit. The first bridge arm includes a first bypass diode and a second bypass diode connected in series. A connection point between the first bypass diode and the second bypass diode is a first node. The first node is electrically connected with a first terminal of the input power source. The second bridge arm is connected with the first bridge arm in parallel. The second bridge arm includes a first switch and a second switch connected in series. A connection point between the first switch and the second switch is a second node. The third bridge arm is connected with the first bridge arm in parallel. The third bridge arm includes a third switch and a fourth switch connected in series. A connection point between the third switch and the fourth switch is a third node. The first inductor is electrically connected between the first terminal of the input power source and the second node. The detection module includes a detection resistor and a detection circuit. A first terminal of the detection resistor, a second terminal of the input power source and a first terminal of the detection circuit are connected with each other. A second terminal of the detection resistor, the third node and a second terminal of the detection circuit are connected with each other. A voltage difference between two terminals of the detection resistor is detected by the detection circuit and an output voltage is outputted from a third terminal of the detection circuit. The control unit is electrically coupled with a third terminal of the detection circuit, and controls the first switch, the second switch, the third switch and the fourth switch. If the control unit confirms that the control unit confirms that the output voltage outputted by the detection circuit is greater than or equal to an upper limit voltage threshold or the output voltage outputted by the detection circuit is smaller than or equal to a lower limit voltage threshold, at least the third switch and the fourth switch are turned off under control of the control unit.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

Figure 1:
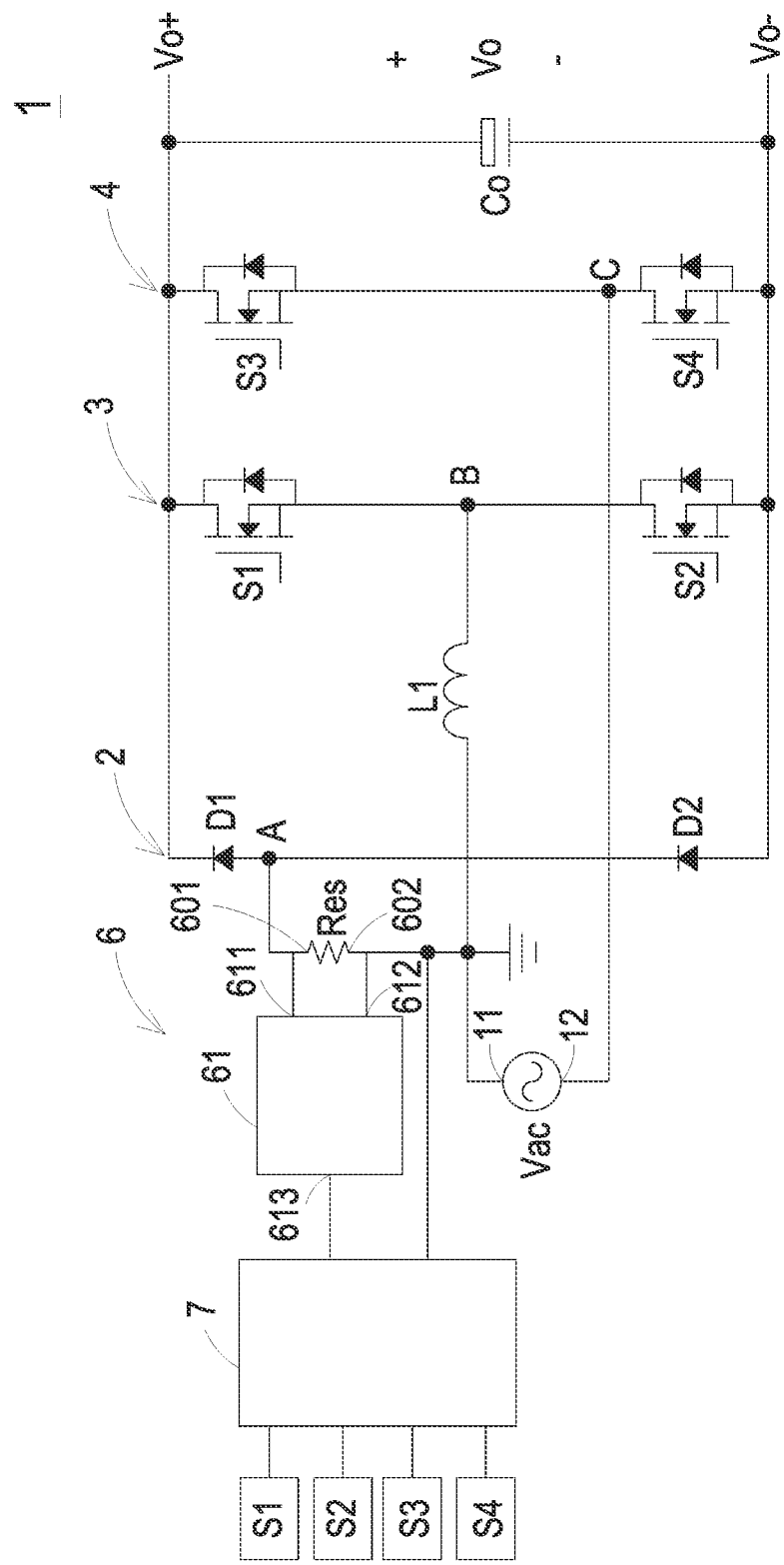
FIG. 1 is a schematic circuit diagram illustrating the circuitry topology of a totem pole power factor correction circuit according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, when an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

FIG. 1 is a schematic circuit diagram illustrating the circuitry topology of a totem pole power factor correction circuit according to a first embodiment of the present disclosure. The totem pole power factor correction circuit 1 receives an input AC power from an input power source Vac. By the totem pole power factor correction circuit 1, the input AC power is converted into an output power. The output power is transmitted to a load (not shown).

The input power source Vac includes a first terminal 11 and a second terminal 12. The input power source Vac provides the input AC power. In the positive half-cycle of the input AC power, the voltage at the first terminal 11 of the input power source Vac is greater than the voltage at the second terminal 12 of the input power source Vac. Under this circumstance, the current flows out of the input power source Vac through the first terminal 11 and flows into the input power source Vac through the second terminal 12. In other words, the first terminal 11 of the input power source Vac is an input positive terminal of the totem pole power factor correction circuit 1, and the second terminal 12 of the input power source Vac is an input negative terminal of the totem pole power factor correction circuit 1. In the negative half-cycle of the input AC power, the voltage at the first terminal 11 of the input power source Vac is lower than the voltage at the second terminal 12 of the input power source Vac. Under this circumstance, the current flows out of the input power source Vac through the second terminal 12 and flows into the input power source Vac through the first terminal 11. In other words, the second terminal 12 of the input power source Vac is the input positive terminal of the totem pole power factor correction circuit 1, and the first terminal 11 of the input power source Vac is the input negative terminal of the totem pole power factor correction circuit 1.

The totem pole power factor correction circuit 1 includes an output positive terminal Vo+, an output negative terminal Vo−, a first bridge arm 2, a second bridge arm 3, a third bridge arm 4, a detection module 6, a control unit 7 and a first inductor L1. The output power is outputted from the totem pole power factor correction circuit 1 to the load through the output positive terminal Vo+ and the output negative terminal Vo−. The totem pole power factor correction circuit 1 is electrically coupled with the load. In some embodiments, the load is connected with the totem pole power factor correction circuit 1 directly, or the load is connected with the totem pole power factor correction circuit 1 indirectly.

The first bridge arm 2 includes a first bypass diode D1 and a second bypass diode D2 connected in series. The cathode of the first bypass diode D1 is connected with the output positive terminal Vo+. The anode of the second bypass diode D2 is connected with the output negative terminal Vo−. The connection point between the anode of the first bypass diode D1 and the cathode of the second bypass diode D2 is a first node A. The first node A is electrically connected with the detection module 6.

The second bridge arm 3 is connected with the first bridge arm 2 in parallel. The second bridge arm 3 includes a first switch S1 and a second switch S2. The first switch S1 and the second switch S2 are connected in series between the output positive terminal Vo+ and the output negative terminal Vo−. The connection point between the first switch S1 and the second switch S2 is a second node B. The first switch S1 and the second switch S2 are electrically connected with the control unit 7 through a driving module (not shown). For succinctness, the connecting relationship between the switches S1 and S2 and the control unit 7 is not shown. The on/off states of the first switch S1 and the second switch S2 are controlled by the control unit 7. In this embodiment, the first switch S1 and the second switch S2 are GaN switches, SiC switches or MOSFET switches. In addition, the first inductor L1 is electrically connected between the first terminal 11 of the input power source Vac and the second node B.

The third bridge arm 4, the first bridge arm 2 and the second bridge arm 3 are connected with in parallel. The third bridge arm 4 includes a third switch S3 and a fourth switch S4. The third switch S3 and the fourth switch S4 are connected in series between the output positive terminal Vo+ and the output negative terminal Vo−. The connection point between the third switch S3 and the fourth switch S4 is a third node C. The third node C is electrically connected with the second terminal 12 of the input power source Vac. The third switch S3 and the fourth switch S4 are electrically connected with the control unit 7 through the driving module (not shown). The on/off states of the third switch S3 and the fourth switch S4 are controlled by the control unit 7. In this embodiment, the third switch S3 and the fourth switch S4 are GaN switches, SiC switches or MOSFET switches.

In an embodiment, the totem pole power factor correction circuit 1 further includes an output capacitor Co. The output capacitor Co is electrically connected between the output positive terminal Vo+ and the output negative terminal Vo−.

Figure 2A:
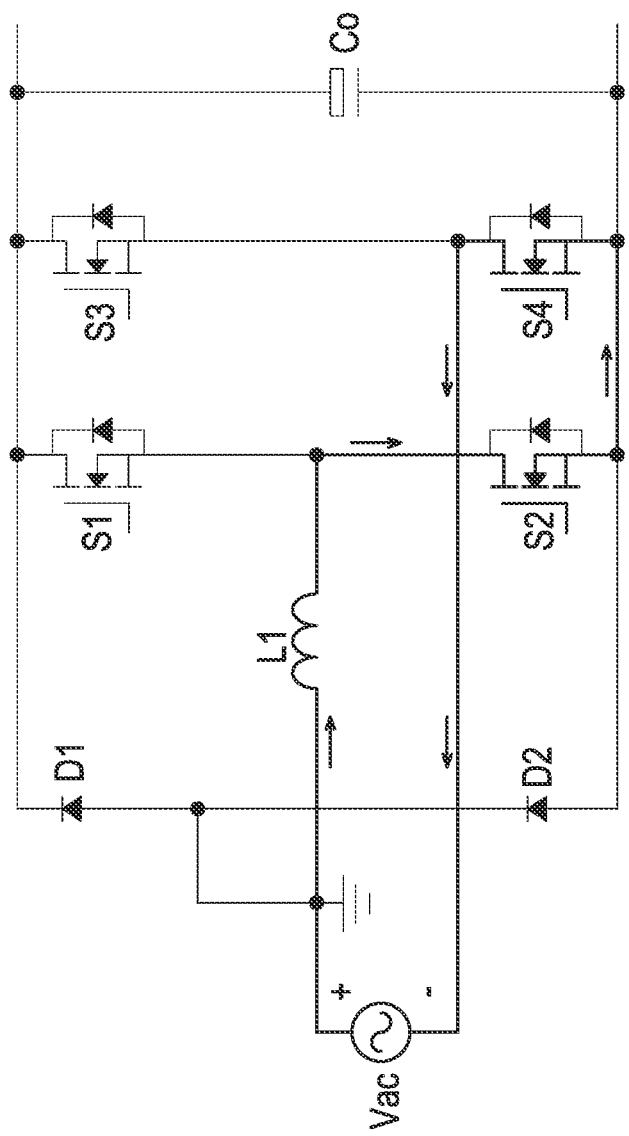
FIGS. 2A and 2B are schematic circuit diagrams illustrating the current direction of the totem pole power factor correction circuit as shown in FIG. 1 when the input AC power of the input power source is in the positive half-cycle.
Figure 2B:
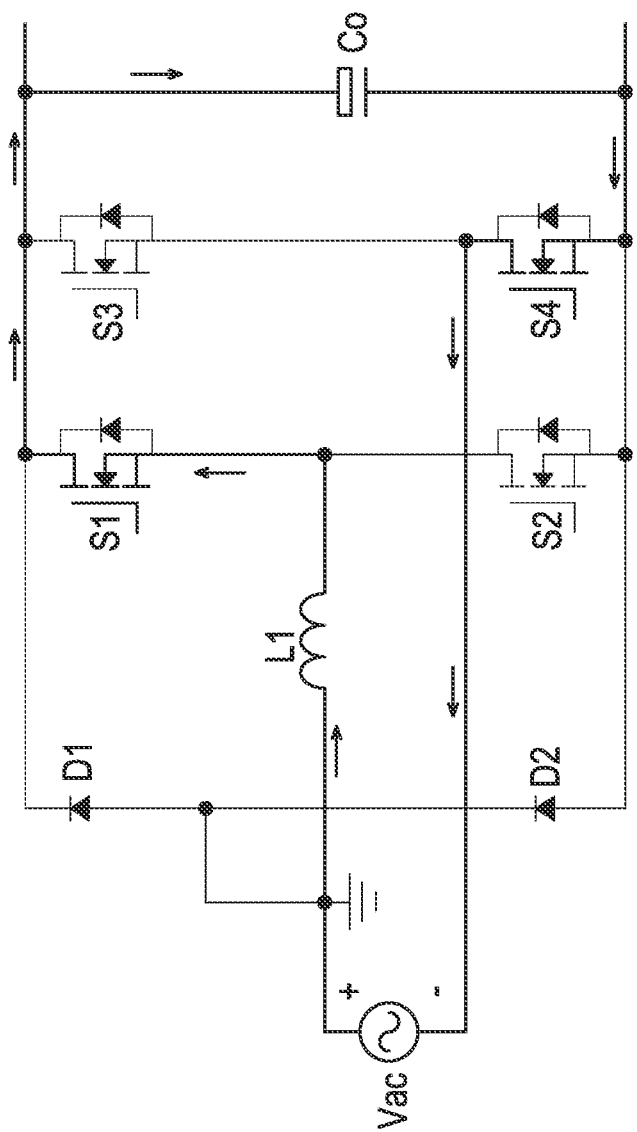
Figure 3A:
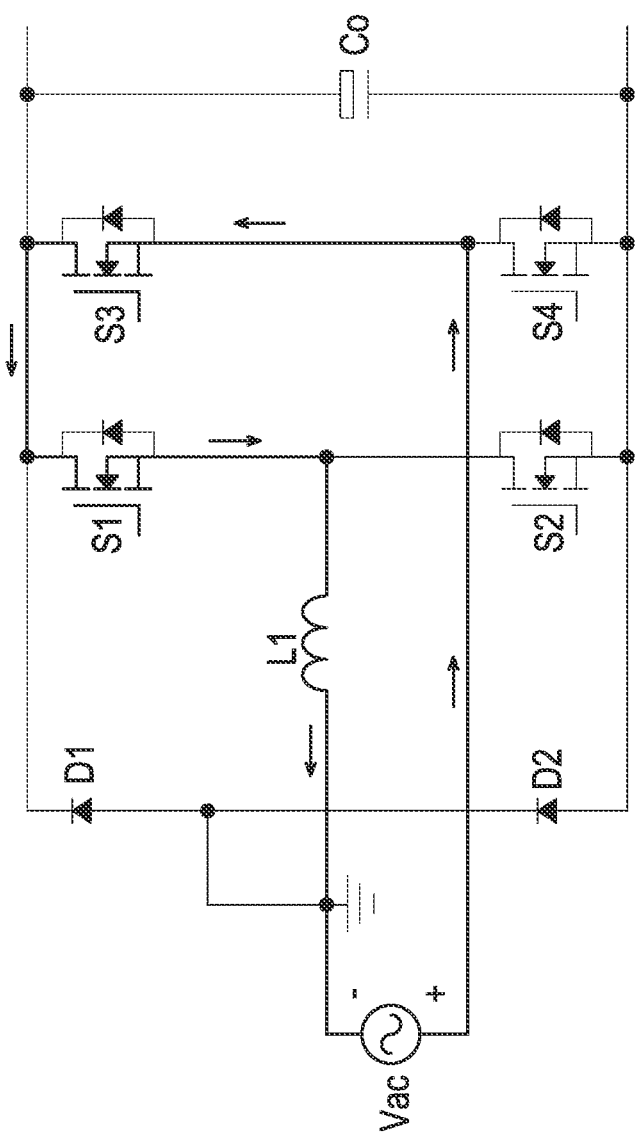
FIGS. 3A and 3B are schematic circuit diagrams illustrating the current direction of the totem pole power factor correction circuit as shown in FIG. 1 when the input AC power of the input power source is in the negative half-cycle.
Figure 3B:
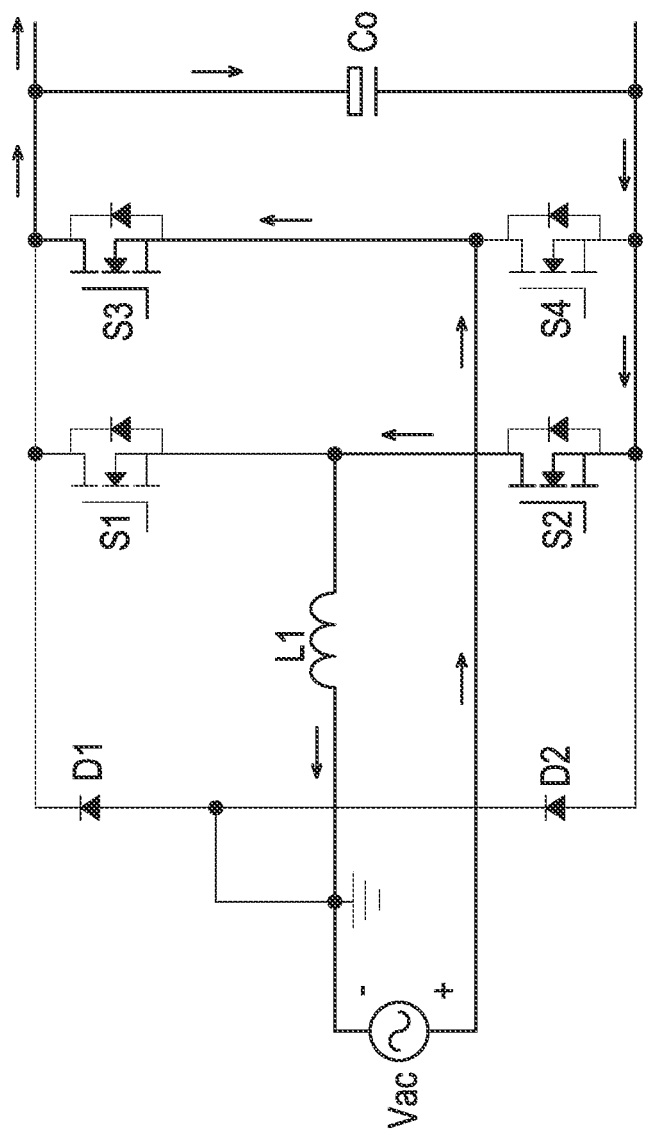

Hereinafter, the current direction of the totem pole power factor correction circuit 1 in the normal working state will be described with reference to FIGS. 2A, 2B, 3A and 3B. FIGS. 2A and 2B are schematic circuit diagrams illustrating the current direction of the totem pole power factor correction circuit as shown in FIG. 1 when the input AC power of the input power source is in the positive half-cycle. FIGS. 3A and 3B are schematic circuit diagrams illustrating the current direction of the totem pole power factor correction circuit as shown in FIG. 1 when the input AC power of the input power source is in the negative half-cycle. In order to well understand the current direction of the totem pole power factor correction circuit 1, the detection module 6 is not shown in FIGS. 2A, 2B, 3A and 3B.

When the input AC power from the input power source Vac is in the positive half-cycle and the first inductor L1 is in a charging mode, the current direction can be seen in FIG. 2A. The second switch S2 and the fourth switch S4 are turned on and the first switch S1 and the third switch S3 are turned off under control of the control unit 7. After the output current from the input power source Vac flows out of the first terminal 11, the output current flows through the first inductor L1, the second switch S2, the fourth switch S4 and the second terminal 12 of the input power source Vac sequentially. Consequently, the first inductor L1 is charged. Then, the operating mode of the first inductor L1 is switched from the charging mode to a discharging mode. Please refer to FIG. 2B. The first switch S1 and the fourth switch S4 are turned on and the second switch S2 and the third switch S3 are turned off under control of the control unit 7. After the output current from the input power source Vac flows out of the first terminal 11, the output current flows through the first inductor L1, the first switch S1, the output capacitor Co (and/or the load), the fourth switch S4 and the second terminal 12 of the input power source Vac sequentially. Consequently, the output capacitor Co is charged and/or the output current is supplied to the load.

When the input AC power from the input power source Vac is in the negative half-cycle and the first inductor L1 is in a charging mode, the current direction can be seen in FIG. 3A. The first switch S1 and the third switch S3 are turned on and the second switch S2 and the fourth switch S4 are turned off under control of the control unit 7. After the output current from the input power source Vac flows out of the second terminal 12, the output current flows through the third switch S3, the first switch S1, the first inductor L1 and the first terminal 11 of the input power source Vac sequentially. Consequently, the first inductor L1 is charged.

Then, the operating mode of the first inductor L1 is switched from the charging mode to a discharging mode. Please refer to FIG. 3B. The second switch S2 and the third switch S3 are turned on and the first switch S1 and the fourth switch S4 are turned off under control of the control unit 7. After output current from the input power source Vac flows out of the second terminal 12, the output current flows through the third switch S3, the output capacitor Co (and/or the load), the second switch S2, the first inductor L1 and the first terminal 11 of the input power source Vac sequentially. Consequently, the output capacitor Co is charged and/or the output current is supplied to the load.

Please refer to FIG. 1. The detection module 6 includes a detection resistor Res and a detection circuit 61. The detection resistor Res includes a first terminal 601 and a second terminal 602. The first terminal 601 of the detection resistor Res is electrically connected with the anode of the first bypass diode D1. The second terminal 602 of the detection resistor Res is electrically connected with the first terminal 11 of the input power source Vac. The output current from the input power source Vac flows through the detection resistor Res. The detection circuit 61 includes a first terminal 611, a second terminal 612 and a third terminal 613. The first terminal 611 of the detection circuit 61, the first terminal 601 of the detection resistor Res and the first node A are connected with each other. The second terminal 612 of the detection circuit 61, the second terminal 602 of the detection resistor Res and the first terminal 11 of the input power source Vac are connected with each other. The third terminal 613 of the detection circuit 61 is electrically connected with the control unit 7.

When the current from the input power source Vac flows through the detection resistor Res, a voltage difference between the two terminals of the detection resistor Res is detected by the detection circuit 61, and an output voltage is outputted from the third terminal 613 of the detection circuit 61. The output voltage from the third terminal 613 of the detection circuit 61 is transmitted to the control unit 7. The control unit 7 is electrically connected with the third terminal 613 of the detection circuit 61 to control all switches (i.e., the first switch S1, the second switch S2, the third switch S3 and the fourth switch S4). According to the output voltage from the third terminal 613 of the detection circuit 61, the control unit 7 determines whether the output voltage is between an upper limit voltage threshold and a lower limit voltage threshold. According to the determining result, the control unit 7 controls the on/off states of the corresponding switches in the totem pole power factor correction circuit 1. Moreover, an output terminal of the control unit 7 is connected to a ground terminal.

When the input AC power from the input power source Vac is in the positive half-cycle and the first inductor L1 is in the charging mode, if the control unit 7 determines that the output voltage outputted from the third terminal 613 of the detection circuit 61 is between the lower limit voltage threshold and the upper limit voltage threshold, the second switch S2 and the fourth switch S4 are turned on, and the first switch S1 and the third switch S3 are turned off under control of the control unit 7, and the current direction can be seen in FIG. 2A. When the input AC power from the input power source Vac is in the positive half-cycle and the first inductor L1 is in the discharging mode, if the control unit 7 determines that the output voltage outputted from the third terminal 613 of the detection circuit 61 is between the lower limit voltage threshold and the upper limit voltage threshold, the first switch S1 and the fourth switch S4 are turned on, and the second switch S2 and the third switch S3 are turned off under control of the control unit 7, and the current direction can be seen in FIG. 2B.

When the input AC power from the input power source Vac is in the negative half-cycle and the first inductor L1 is in the charging mode, if the control unit 7 determines that the output voltage outputted from the third terminal 613 of the detection circuit 61 is between the lower limit voltage threshold and the upper limit voltage threshold, the first switch S1 and the third switch S3 are turned on and the second switch S2, and the fourth switch S4 are turned off under control of the control unit 7, and the current direction can be seen in FIG. 3A. When the input AC power from the input power source Vac is in the negative half-cycle and the first inductor L1 is in the discharging mode, if the control unit 7 determines that the output voltage outputted from the third terminal 613 of the detection circuit 61 is between the lower limit voltage threshold and the upper limit voltage threshold, the second switch S2 and the third switch S3 are turned on, and the first switch S1 and the fourth switch S4 are turned off under control of the control unit 7, and the current direction can be seen in FIG. 3B. On the other hand, if the control unit 7 determines that the output voltage outputted from the third terminal 613 of the detection circuit 61 is greater than or equal to the upper limit voltage threshold or lower than or equal to the lower limit voltage threshold, at least the third switch S3 and the fourth switch S4 are turned off under control of the control unit 7. In an embodiment, if the control unit 7 determines that the output voltage outputted from the third terminal 613 of the detection circuit 61 is greater than or equal to the upper limit voltage threshold or lower than or equal to the lower limit voltage threshold, all of the first switch S1, the second switch S2, the third switch S3 and the fourth switch S4 are turned off under control of the control unit 7.

As mentioned above, the detection module 6 in the totem pole power factor correction circuit 1 includes the detection resistor Res and the detection circuit 61. If the output voltage outputted from the third terminal 613 of the detection circuit 61 is greater than or equal to the upper limit voltage threshold or lower than or equal to the lower limit voltage threshold, at least the third switch S3 and the fourth switch S4 are turned off under control of the control unit 7. In other words, the control unit 7 determines whether the totem pole power factor correction circuit 1 is in the normal working state according to the result of comparing the output voltage outputted from the third terminal 613 of the detection circuit 61 with the upper limit voltage threshold and the lower limit voltage threshold.

If the output voltage outputted from the third terminal 613 of the detection circuit 61 is greater than or equal to the upper limit voltage threshold or lower than or equal to the lower limit voltage threshold, the control unit 7 determines that the totem pole power factor correction circuit 1 is in the abnormal state (e.g., in a short-circuited condition). When the totem pole power factor correction circuit 1 is operated in the abnormal state, The corresponding switches will be turned off under control of the control unit 7. Consequently, the totem pole power factor correction circuit 1 can be protected.

As mentioned above, if the switches are erroneously triggered or the polarity of the power supply is suddenly reversed because of unexpected situations (e.g., thunder) and the inconsistent control occurs due to time delay, the input power source connected with the bypass diodes is possibly in the short-circuited condition. For example, the on-state fourth switch S4 of the totem pole power factor correction circuit 1 in the normal working state and shown in FIG. 2A is erroneously turned off, but the off-state third switch S3 is erroneously turned on. Similarly, the on-state third switch S3 of the totem pole power factor correction circuit 1 in the normal working state and shown in FIG. 3A is erroneously turned off, but the off-state fourth switch S4 is erroneously turned on. If the output voltage outputted by the detection circuit is greater than or equal to the upper limit voltage threshold or lower than or equal to the lower limit voltage threshold, the corresponding switches in the totem pole power factor correction circuit 1 are rapidly turned off under control of the control unit 7. Under this circumstance, the protecting measure can be taken immediately. Consequently, the possibility of causing damage of the totem pole power factor correction circuit 1 will be minimized. In other words, the performance of the totem pole power factor correction circuit 1 is enhanced.

Figure 4:
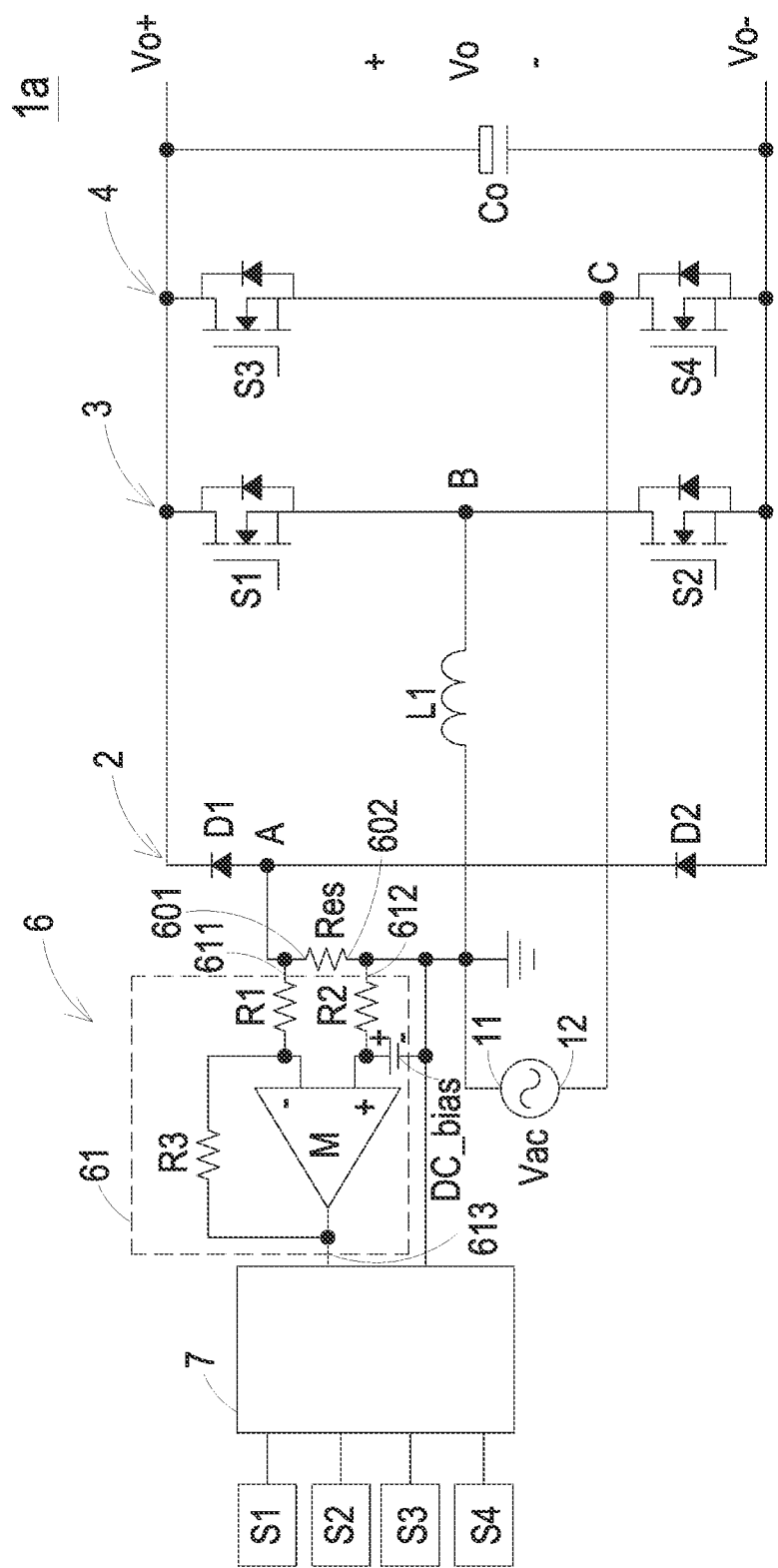
FIG. 4 is a schematic circuit diagram illustrating an exemplary circuitry topology of the detection circuit in the totem pole power factor correction circuit according to a second embodiment.

In an embodiment, the detection circuit 61 of the detection module 6 includes an inverse proportional amplifying circuit. FIG. 4 is a schematic circuit diagram illustrating an exemplary circuitry topology of the detection circuit in the totem pole power factor correction circuit according to a second embodiment. As shown in FIG. 4, the detection circuit 61 of the totem pole power factor correction circuit 1a includes an amplifier M, a first resistor R1, a second resistor R2, a third resistor R3 and a DC power supply DC_bias. The output terminal of the amplifier M is electrically coupled with the third terminal 613 of the detection circuit 61. The first resistor R1 is electrically connected between the negative input terminal of the amplifier M and the first terminal 611 of the detection circuit 61. The second resistor R2 is electrically connected between the positive input terminal of the amplifier M and the second terminal 612 of the detection circuit 61. The third resistor R3 is electrically connected between the negative input terminal of the amplifier M and the output terminal of the amplifier M. The positive terminal of the DC power supply $DC_{\_bias}$ is electrically coupled with the positive input terminal of the amplifier M. The negative terminal of the DC power supply $DC_{\_bias}$ is electrically connected with the second terminal 612 of the detection circuit 61. In addition, the negative terminal of the DC power supply $DC_{\_bias}$ is connected to the ground terminal. The DC power supply $DC_{\_bias}$ provides a positive bias voltage to the amplifier M. In some embodiments, the DC power supply $DC_{\_bias}$ is a DC power supply, e.g., a linear voltage regulator circuit, a buck converter, a flyback converter or any other appropriate DC converter.

When the input AC power from the input power source Vac is in the positive half-cycle, the output current from the input power source Vac flows out of the first terminal 11, flows through the detection resistor Res, and flows to the first terminal 611 of the detection circuit 61. When the output current flows through the detection resistor Res, there is a voltage drop at the two terminals of the detection resistor Res. The voltage difference between the two terminals of the detection resistor Res is equal to Iinrush×Res, wherein Iinrush is the current flowing through the detection resistor Res, and Res is the resistance of the detection resistor Res. After the voltage difference between the two terminals of the detection resistor Res is subjected to differential computation by the amplifier M, the amplifier M generates an output voltage to the control unit 7. That is, the voltage difference between the two terminals of first detection resistor Res is amplified and biased, and then the output voltage is generated to the control unit 7. The output voltage from the amplifier M may be expressed as the following formula:

$$Vo = DC_{\_bias} * \left(1 + \frac{R3}{R1}\right) + Iinrush * Res * \frac{R3}{R1}$$

In the above formula, $DC_{\_bias}$ is the DC bias voltage provided by the DC power supply $DC_{\_bias}$, R1 is the resistance of the first resistor, and R3 is the resistance of the third resistor.

Then, according to the result of determining whether the output voltage Vo from the amplifier M is between the upper limit voltage threshold and the lower limit voltage threshold, the on/off states of the corresponding switches in the totem pole power factor correction circuit 1a are controlled by the control unit 7. If the output voltage Vo from the amplifier M is greater than or equal to the upper limit voltage threshold or lower than or equal to the lower limit voltage threshold, the control unit 7 determines that the totem pole power factor correction circuit 1a is in the abnormal state (e.g., in a short-circuited condition). Consequently, at least the third switch S3 and the fourth switch S4 are turned off under control of the control unit 7, and the totem pole power factor correction circuit 1a is effectively protected.

In an embodiment, the upper limit voltage threshold is 3/2×$DC_{\_bias}$×(1+R3/R1).

When the input AC power from the input power source Vac is in the negative half-cycle, the output current from the input power source Vac flows out of the second terminal 12, flows through the first detection resistor Res and the second terminal 612 of the detection circuit 61 sequentially, and flows into the first terminal 11 of the input power source Vac. When the output current flows through the detection resistor Res, there is a voltage drop at the two terminals of the detection resistor Res. The voltage difference between the two terminals of the detection resistor Res is equal to −Iinrush×Res, wherein Iinrush is the current flowing through the detection resistor Res, and Res is the resistance of the detection resistor Res. After the voltage difference between the two terminals of the detection resistor Res is subjected to differential computation by the amplifier M, the amplifier M generates the output voltage to the control unit 7. That is, the voltage difference between the two terminals of first detection resistor Res is amplified and biased, and thus the output voltage is generated to the control unit 7. The output voltage from the amplifier M may be expressed as the following formula:

$$Vo = DC_{\_bias} * \left(1 + \frac{R3}{R1}\right) + Iinrush * Res * \frac{R3}{R1}$$

In the above formula, $DC_{\_bias}$ is the DC bias voltage provided by the DC power supply $DC_{\_bias}$, R1 is the resistance of the first resistor, and R3 is the resistance of the third resistor. Then, according to the result of determining whether the output voltage Vo from the amplifier M is between the upper limit voltage threshold and the lower limit voltage threshold, the on/off states of the corresponding switches in the totem pole power factor correction circuit 1a are controlled by the control unit 7. If the output voltage Vo from the amplifier M is greater than or equal to the upper limit voltage threshold or lower than or equal to the lower limit voltage threshold, the control unit 7 determines that the totem pole power factor correction circuit 1a is in the abnormal state (e.g., in a short-circuited condition). Consequently, at least the third switch S3 and the fourth switch S4 are turned off under control of the control unit 7, and the totem pole power factor correction circuit 1a is effectively protected. In an embodiment, the lower limit voltage threshold is 1/2×$DC_{\_bias}$×(1+R3/R1).

Figure 5:
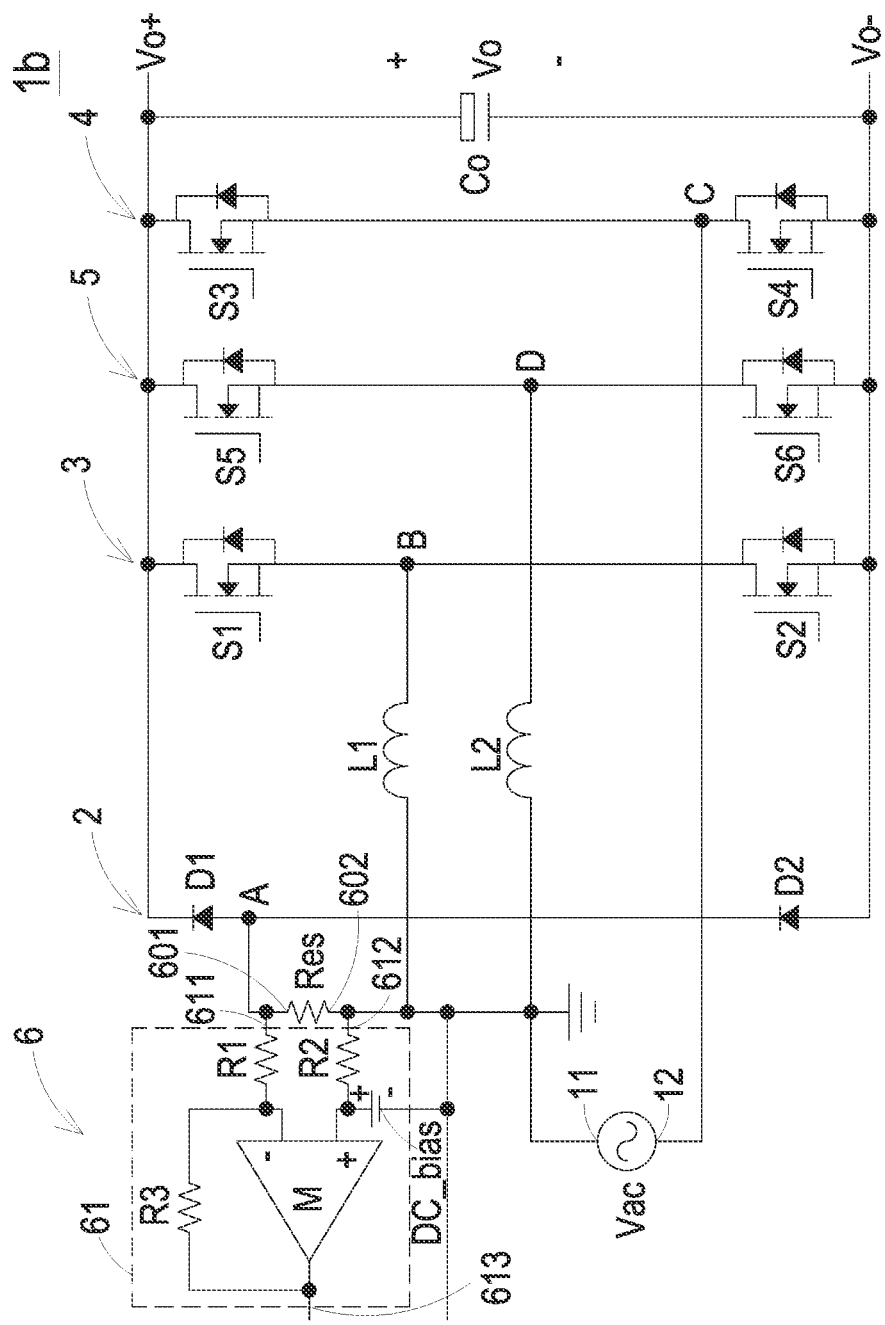
FIG. 5 is a schematic circuit diagram illustrating the circuitry topology of a totem pole power factor correction circuit according to a third embodiment of the present disclosure.

In the embodiment of FIG. 1, the totem pole power factor correction circuit 1 includes four switches. It is noted that the number of switches in the totem pole power factor correction circuit may be adjusted according to the practical requirements. FIG. 5 is a schematic circuit diagram illustrating the circuitry topology of a totem pole power factor correction circuit according to a third embodiment of the present disclosure. In comparison with the totem pole power factor correction circuit of FIG. 1, the totem pole power factor correction circuit 1b of this embodiment includes sixth switches. In addition to the first switch S1 and the second switch S2 of the second bridge arm 3 and the third switch S3 and the fourth switch S4 of the third bridge arm 4, the totem pole power factor correction circuit 1b of this embodiment further includes a fifth switch S5 and a sixth switch S6.

The fifth switch S5 and the sixth switch S6 are connected in series between the output positive terminal Vo+ and the output negative terminal Vo−. The fifth switch S5 and the sixth switch S6 are collaboratively formed as a fourth bridge arm 5. The fourth bridge arm 5, the first bridge arm 2, the second bridge arm 3 and the third bridge arm 4 are connected with each other in parallel. The connection point between the fifth switch S5 and the sixth switch S6 is a fourth node D. The fifth switch S5 and the sixth switch S6 are electrically connected with the control unit 7 through a driving module (not shown). For succinctness, the connecting relationship between the switches S5 and S6 and the control unit 7 is not shown. The on/off states of the fifth switch S5 and the sixth switch S6 are controlled by the control unit 7. The operations of the fifth switch S5 and the sixth switch S6 of the fourth bridge arm 5 are similar to the operations of the first switch S1 and the second switch S2 of the second bridge arm 3, and not redundantly described herein. In this embodiment, the fifth switch S5 and the sixth switch S6 are SiC switches, GaN switches or MOSFET switches.

The totem pole power factor correction circuit 1b of this embodiment further includes a second inductor L2. The second inductor L2 is electrically connected between the first terminal 11 of the input power source Vac and the fourth node D.

Figure 6:
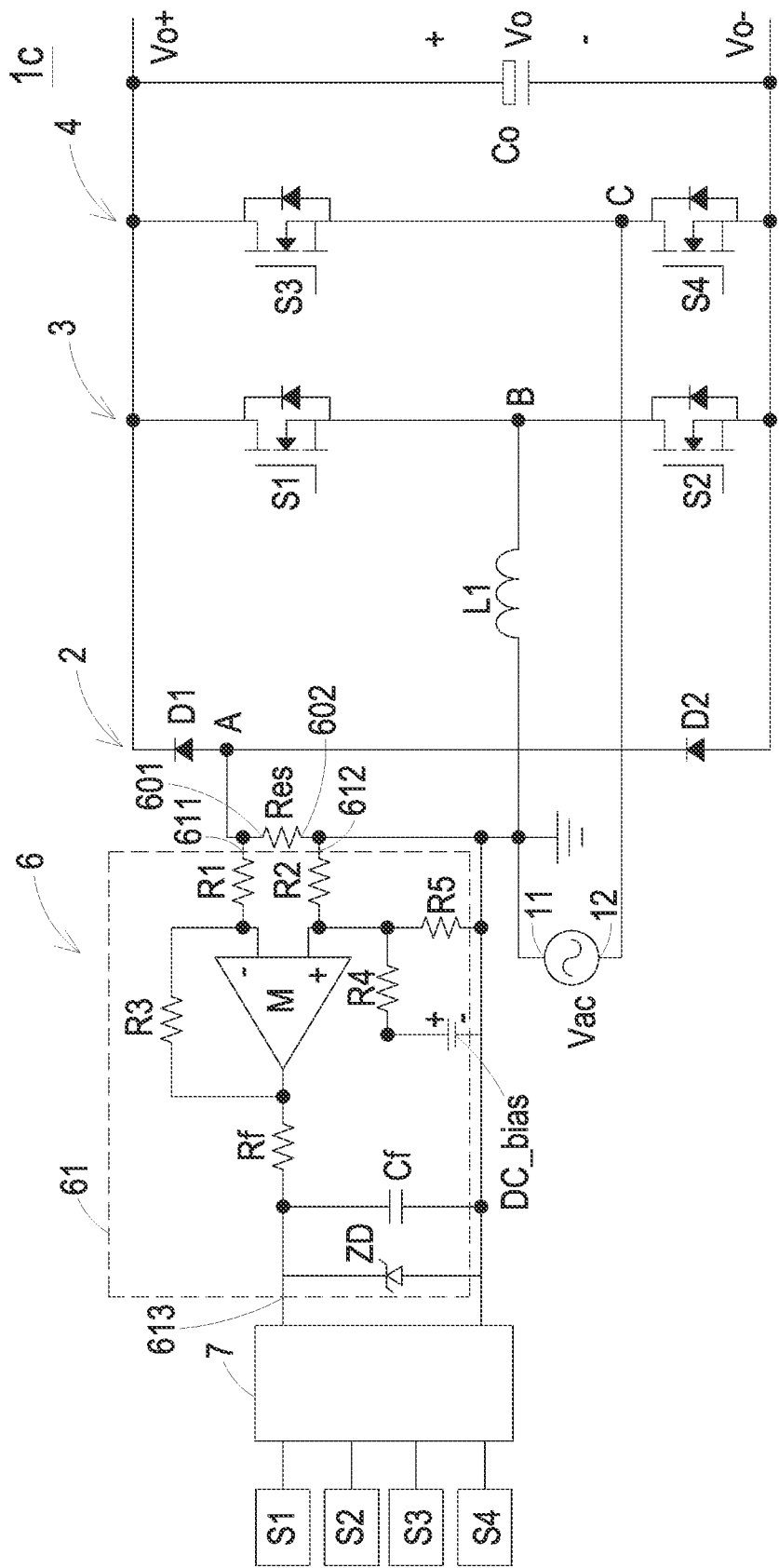
FIG. 6 is a schematic circuit diagram illustrating the circuitry topology of a totem pole power factor correction circuit according to a fourth embodiment of the present disclosure.

Generally, if the output voltage from the detection circuit 61 is disturbed, the misjudgment of the control unit 7 occurs. For solving the misjudgment problem, the detection circuit 61 needs to be further modified. For example, in some embodiments, the detection circuit 61 further includes a filtering resistor and a filtering capacitor. FIG. 6 is a schematic circuit diagram illustrating the circuitry topology of a totem pole power factor correction circuit according to a fourth embodiment of the present disclosure. In comparison with the totem pole power factor correction circuit 1a of FIG. 4, the detection circuit 61 in the totem pole power factor correction circuit 1c of this embodiment further includes a filtering resistor Rf and a filtering capacitor Cf.

The filtering resistor Rf is electrically connected between the output terminal of the amplifier M and the third terminal 613 of the detection circuit 61. The filtering capacitor Cf is electrically connected with the filtering resistor Rf and the second terminal 612 of the detection circuit 61. The filtering resistor Rf and the filtering capacitor Cf cooperate with each other to filter the output voltage. Moreover, in some embodiments, the detection circuit 61 further includes a Zener diode ZD. As shown in FIG. 6, the anode of the Zener diode ZD is electrically connected with the second terminal 612 of the detection circuit 61, and the cathode of the Zener diode ZD is electrically connected with the third terminal 613 of the detection circuit 61. The output voltage to be transmitted from the detection circuit 61 to the control unit 7 can be clamped and protected by the Zener diode ZD.

In order to increase the flexibility of the DC power supply $DC_{\_bias}$, the bias voltage required by the amplifier M can be obtained through voltage division. As shown in FIG. 6, the detection circuit 61 in the totem pole power factor correction circuit 1c of this embodiment further includes a first divider resistor R4 and a second divider resistor R5. The first divider resistor R4 is electrically connected between the positive input terminal of the amplifier M and the positive terminal of the DC power supply DC_bias. The second divider resistor R5 is electrically connected between the positive input terminal of the amplifier M and the second terminal 612 of the detection circuit 61. In an embodiment, the DC power supply DC_bias not only provides the positive bias voltage to the amplifier M, but also supplies power to the control unit 7.

Figure 7:
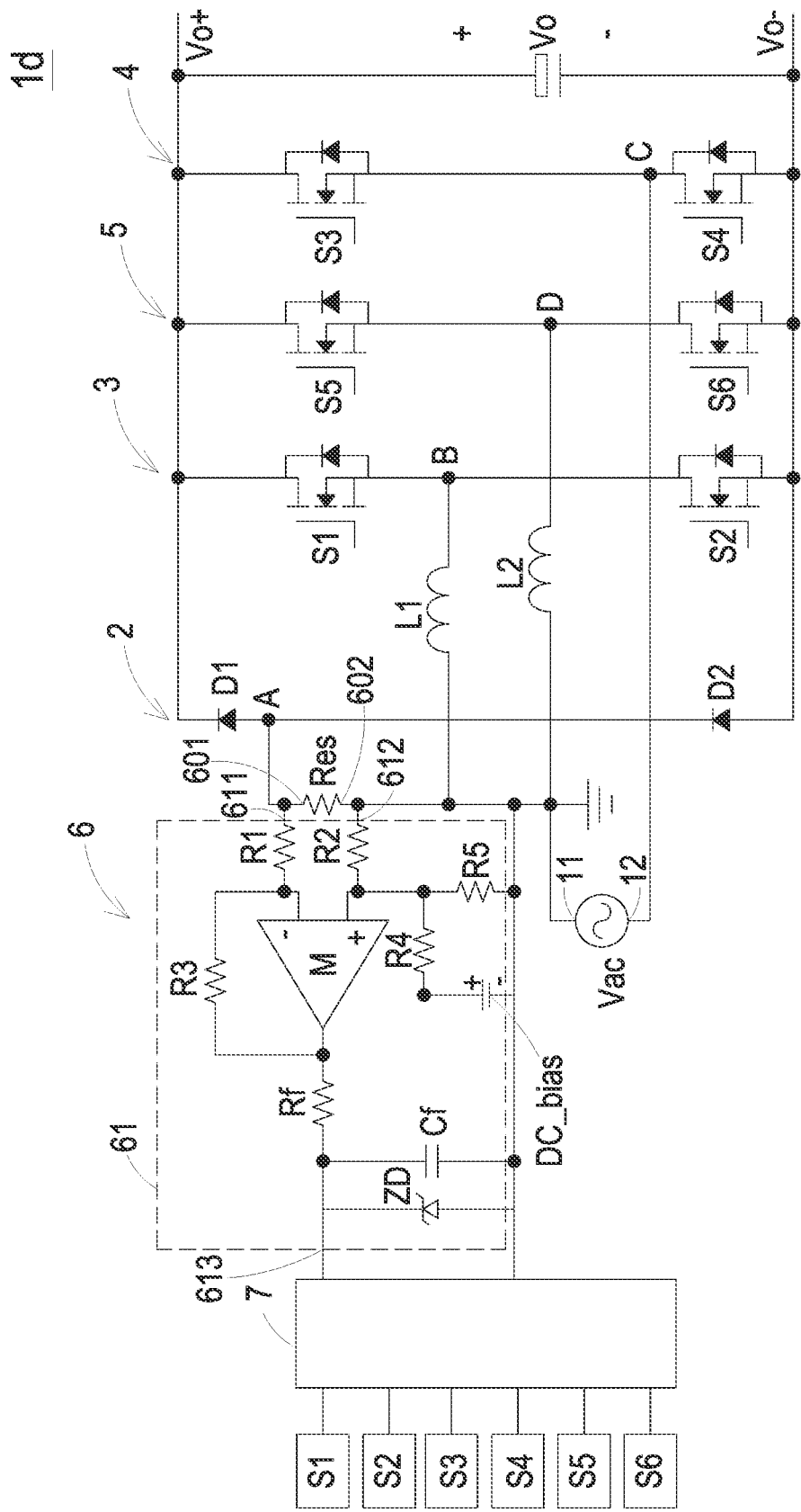
FIG. 7 is a schematic circuit diagram illustrating the circuitry topology of a totem pole power factor correction circuit according to a fifth embodiment of the present disclosure.

In an embodiment, the totem pole power factor correction circuit further includes six switches, filtering components and divider resistors. FIG. 7 is a schematic circuit diagram illustrating the circuitry topology of a totem pole power factor correction circuit according to a fifth embodiment of the present disclosure. As shown in FIG. 7, the totem pole power factor correction circuit 1d of this embodiment includes the first switch S1 and the second switch S2 of the first bridge arm 3, the third switch S3 and the fourth switch S4 of the third bridge arm 4 and the fifth switch S5 and the sixth switch S6 of the fourth bridge arm 5. The circuitry topology of the six switches are similar to the circuitry topology of the embodiment as shown in FIG. 5, and not redundantly described herein. Moreover, the detection circuit 61 of the totem pole power factor correction circuit 1d includes the filtering resistor Rf, the filtering resistor Cf, the Zener diode ZD, the first divider resistor R4 and the second divider resistor R5. The circuitry topology of these components is similar to the circuitry topology of the embodiment as shown in FIG. 6, and not redundantly described herein.

Figure 8:
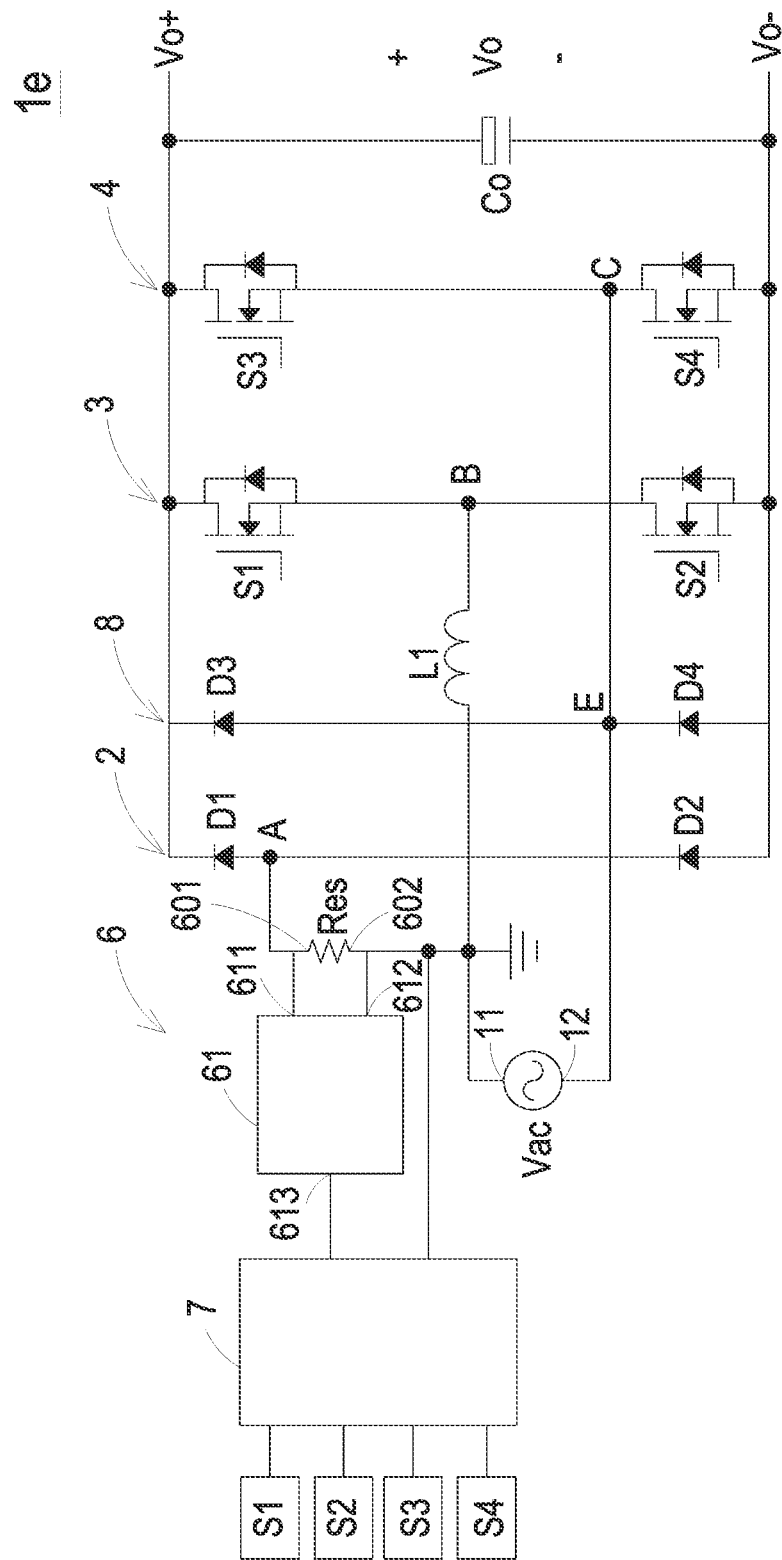
FIG. 8 is a schematic circuit diagram illustrating the circuitry topology of a totem pole power factor correction circuit according to a sixth embodiment of the present disclosure.

In the embodiment of FIG. 1, the totem pole power factor correction circuit 1 includes two bypass diodes. It is noted that the number of bypass diodes in the totem pole power factor correction circuit may be adjusted according to the practical requirements. FIG. 8 is a schematic circuit diagram illustrating the circuitry topology of a totem pole power factor correction circuit according to a sixth embodiment of the present disclosure. In comparison with the totem pole power factor correction circuit 1 of FIG. 1, the totem pole power factor correction circuit 1e of this embodiment includes four bypass diodes. In addition to the first bypass diode D1 and the second bypass diode D2 of the first bridge arm 2, the totem pole power factor correction circuit 1e of this embodiment further includes a third bypass diode D3 and a fourth bypass diode D4.

The third bypass diode D3 and the fourth bypass diode D4 are connected in series between the output positive terminal Vo+ and the output negative terminal Vo−. The third bypass diode D3 and the fourth bypass diode D4 are collaboratively formed as a fifth bridge arm 8. The fifth bridge arm 8, the first bridge arm 2, the second bridge arm 3, the third bridge arm 4, the fourth bridge arm 5 are connected with each other in parallel. The connection point between the third bypass diode D3 and the fourth bypass diode D4 is a fifth node E. The fifth node E is electrically connected with the second terminal 12 of the input power source Vac. By the first bypass diode D1 and the second bypass diode D2 of the first bridge arm 2 and the third bypass diode D3 and the fourth bypass D4 of the fifth bridge arm 8, the output capacitor Co is pre-charged before the totem pole power factor correction circuit 1e is enabled.

Figure 9:
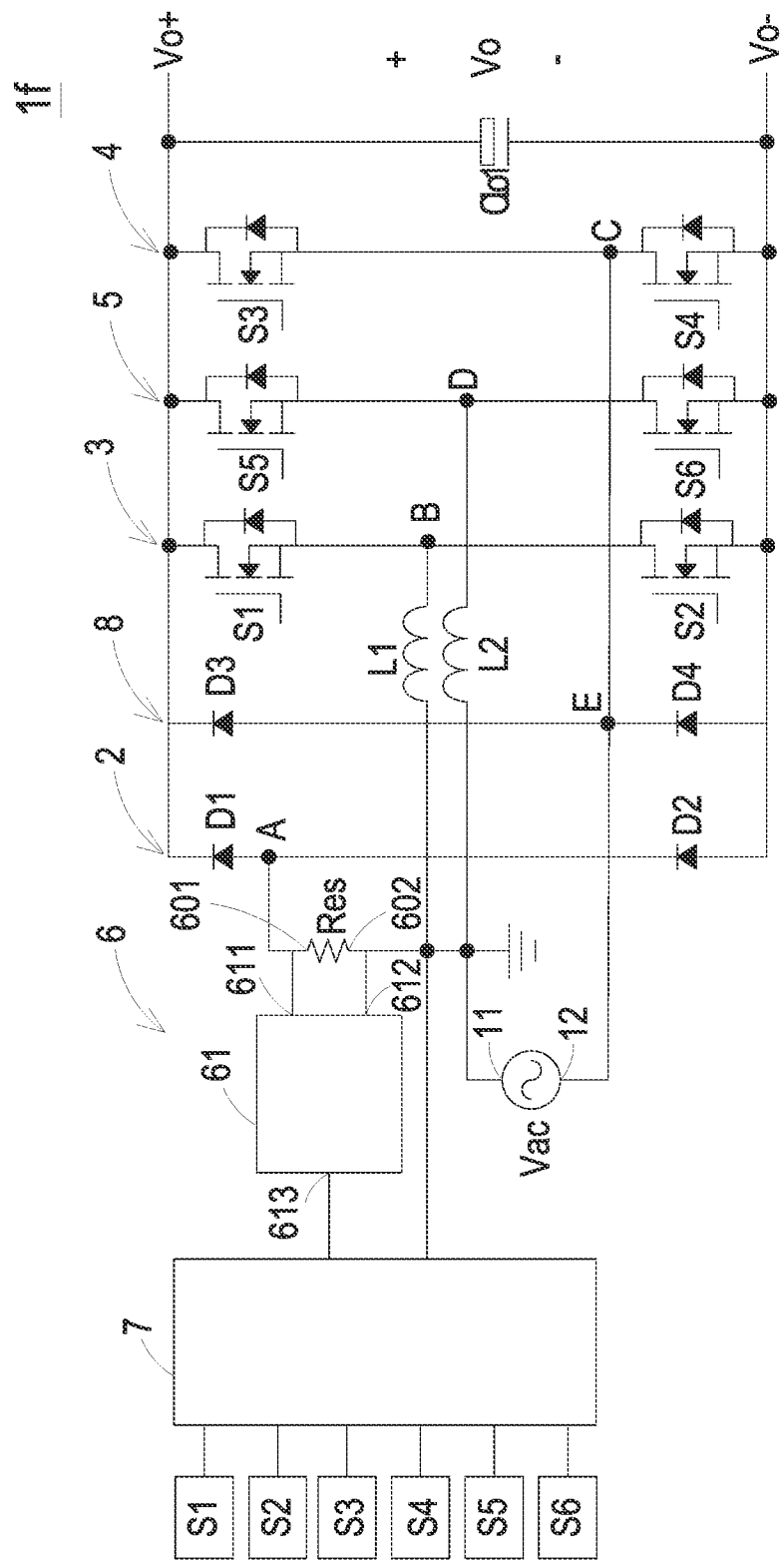
FIG. 9 is a schematic circuit diagram illustrating the circuitry topology of a totem pole power factor correction circuit according to a seventh embodiment of the present disclosure.

It is noted that the number of switches and the number of the bypass diodes in the totem pole power factor correction circuit may be adjusted according to the practical requirements. FIG. 9 is a schematic circuit diagram illustrating the circuitry topology of a totem pole power factor correction circuit according to a seventh embodiment of the present disclosure. The totem pole power factor correction circuit 1e as shown in FIG. 8 only includes four switches (i.e., the first switch S1 and the second switch S2 of the second bridge arm 3 and the third switch S3 and the fourth switch S4 of the third bridge arm 4). In comparison with the totem pole power factor correction circuit 1e of FIG. 8, the totem pole power factor correction circuit 1f of this embodiment includes six switches. In addition to the first switch S1 and the second switch S2 of the second bridge arm 3 and the third switch S3 and the fourth switch S4 of the third bridge arm 4, the totem pole power factor correction circuit 1f of this embodiment further includes a fifth switch S5 and a sixth switch S6.

The fifth switch S5 and the sixth switch S6 are connected in series between the output positive terminal Vo+ and the output negative terminal Vo−. The fifth switch S5 and the sixth switch S6 are collaboratively formed as a fourth bridge arm 5. The fourth bridge arm 5, the first bridge arm 2, the second bridge arm 3 and the third bridge arm 4 are connected with each other in parallel. The connection point between the fifth switch S5 and the sixth switch S6 is a fourth node D. The fifth switch S5 and the sixth switch S6 are electrically connected with the control unit 7 through a driving module (not shown). For succinctness, the connecting relationship between the switches S5 and S6 and the control unit 7 is not shown. The on/off states of the fifth switch S5 and the sixth switch S6 are controlled by the control unit 7. The operations of the fifth switch S5 and the sixth switch S6 of the fourth bridge arm 5 are similar to the operations of the first switch S1 and the second switch S2 of the second bridge arm 3, and not redundantly described herein. In this embodiment, the fifth switch S5 and the sixth switch S6 are SiC switches, GaN switches or MOSFET switches.

The totem pole power factor correction circuit 1f of this embodiment further includes a second inductor L2. The second inductor L2 is electrically connected between the first terminal 11 of the input power source Vac and the fourth node D.

Figure 10:
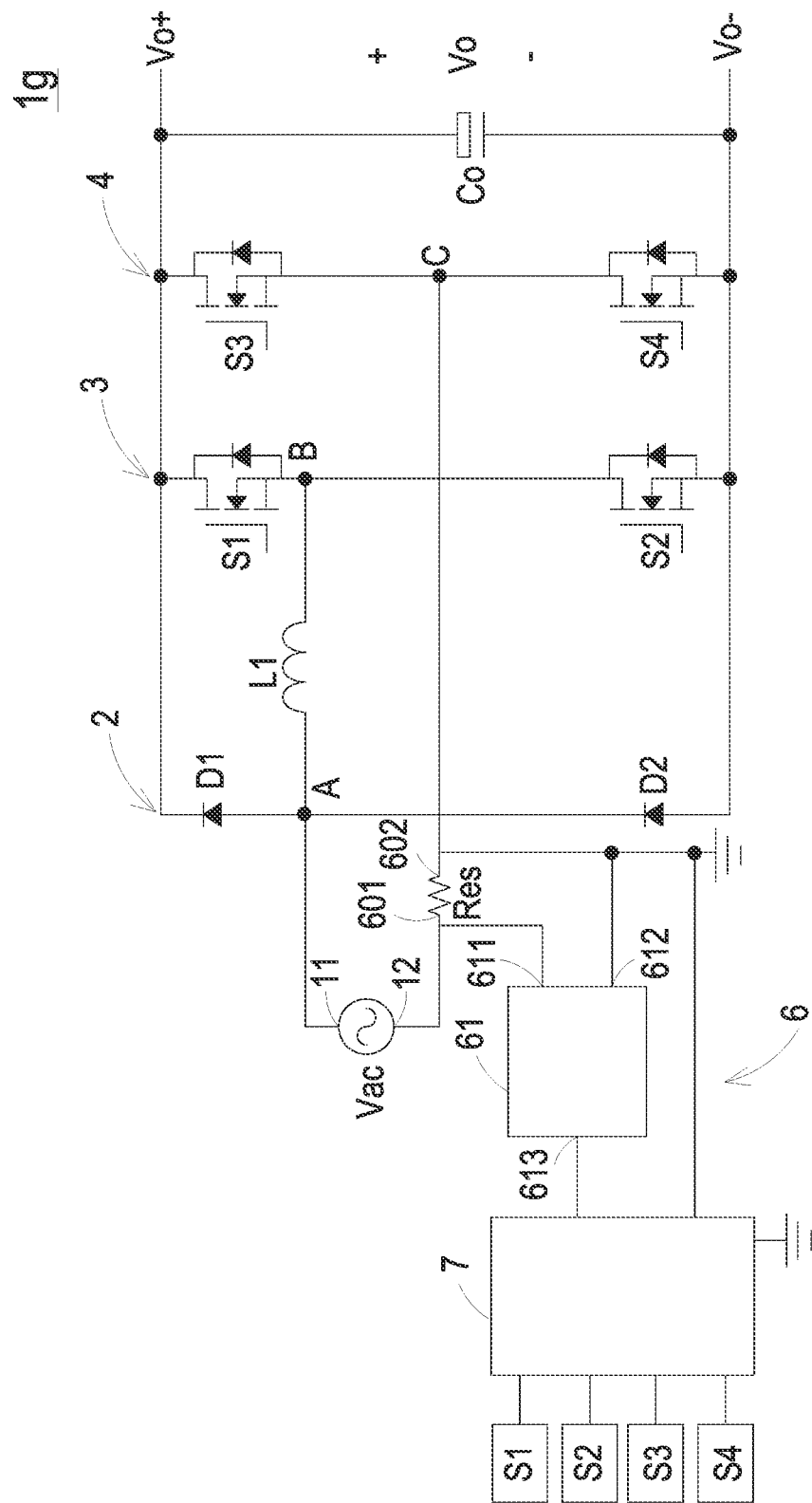
FIG. 10 is a schematic circuit diagram illustrating the circuitry topology of a totem pole power factor correction circuit according to an eighth embodiment of the present disclosure.

It is noted that the installation position of the detection module in the totem pole power factor correction circuit may be adjusted according to the practical requirements. FIG. 10 is a schematic circuit diagram illustrating the circuitry topology of a totem pole power factor correction circuit according to an eighth embodiment of the present disclosure. In the embodiment of FIG. 1, the first terminal 601 of the detection resistor Res in the detection module of the totem pole power factor correction circuit 1 is electrically connected with the anode of the first bypass diode D1, and the second terminal 602 of the detection resistor Res is electrically connected with the first terminal 11 of the input power source Vac. In comparison with the totem pole power factor correction circuit 1 as shown in FIG. 1, the installation position of the detection module 6 in the totem pole power factor correction circuit 1g of this embodiment is distinguished. In the detection module 6 of the totem pole power factor correction circuit 1g, the first terminal 601 of the detection module Res is electrically connected with the second terminal 12 of the input power source Vac, and the second terminal 602 of the detection resistor Res is electrically connected with the third node C. The first terminal 611 of the detection circuit 61, the first terminal 601 of the detection resistor Res and the second terminal 12 of the input power source Vac are connected with each other. The second terminal 612 of the detection circuit 61, the second terminal 602 of the detection resistor Res and the third node C are connected with each other and connected with the ground terminal. The third terminal 613 of the detection circuit 61 is electrically connected with the control unit 7.

When the current from the input power source flows through the detection resistor Res, the detection circuit 61 detects the voltage difference between the first terminal 611 and the second terminal 612 of the detection circuit 61. According to the voltage difference between the first terminal 611 and the second terminal 612 of the detection circuit 61, an output voltage is outputted by the detection circuit 61. The output voltage is transmitted to the control unit 7 through the third terminal 613 of the detection circuit 61. The control unit 7 is electrically connected with the third terminal 613 of the detection circuit 61 and control all switches (i.e., the first switch S1, the second switch S2, the third switch S3 and the fourth switch S4). According to the output voltage from the third terminal of the detection circuit 61, the control unit 7 determines whether the output voltage is between the upper limit voltage threshold and the lower limit voltage threshold. According to the determining result, the control unit 7 controls the on/off states in the corresponding switches. Moreover, the output terminal of the control unit 7 is connected to a ground terminal.

In this embodiment, the first inductor L1 of this embodiment is electrically connected between the first terminal 11 of the input power source Vac and the second node B.

Figure 10A:
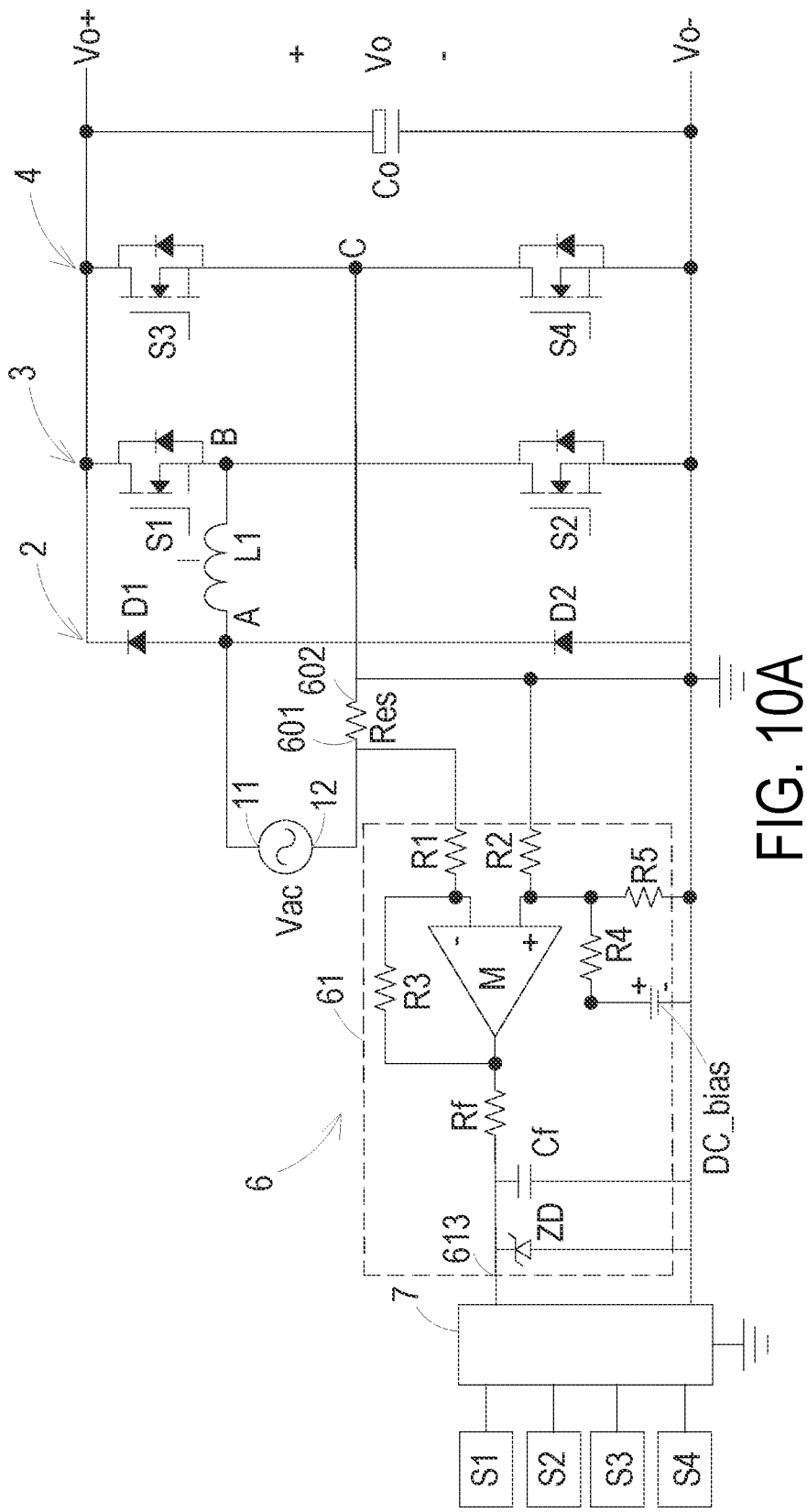
FIG. 10A is a schematic circuit diagram illustrating the circuitry topology of a totem pole power factor correction circuit according to an embodiment of the present disclosure.

In some embodiments, For example, the embodiment shown in FIG. 10A, the detection circuit 61 in the totem pole power factor correction circuit 1g further includes an amplifier M, a first resistor R1, a second resistor R2, a third resistor R3 and a DC power supply $DC_{\_bias}$, a filtering resistor Rf, a filtering capacitor Cf, a Zener diode ZD, a first divider resistor R4 and a second divider resistor R5. The circuitry topology of these components is similar to the circuitry topologies as shown in FIGS. 4 and 6, and not redundantly described herein.

If the output voltage outputted from the third terminal of the detection circuit is between the upper limit voltage threshold and the lower limit voltage threshold, the control unit 7 determines that the totem pole power factor correction circuit 1g is in the normal working state. When the input AC power of the input power source in the totem pole power factor correction circuit 1g is in the positive half-cycle, the current direction is similar to the current direction shown in FIGS. 2A and 2B. When the AC voltage of the input power source in the totem pole power factor correction circuit 1g is in the negative half-cycle, the current direction is similar to the current direction shown in FIGS. 3A and 3B.

Figure 11:
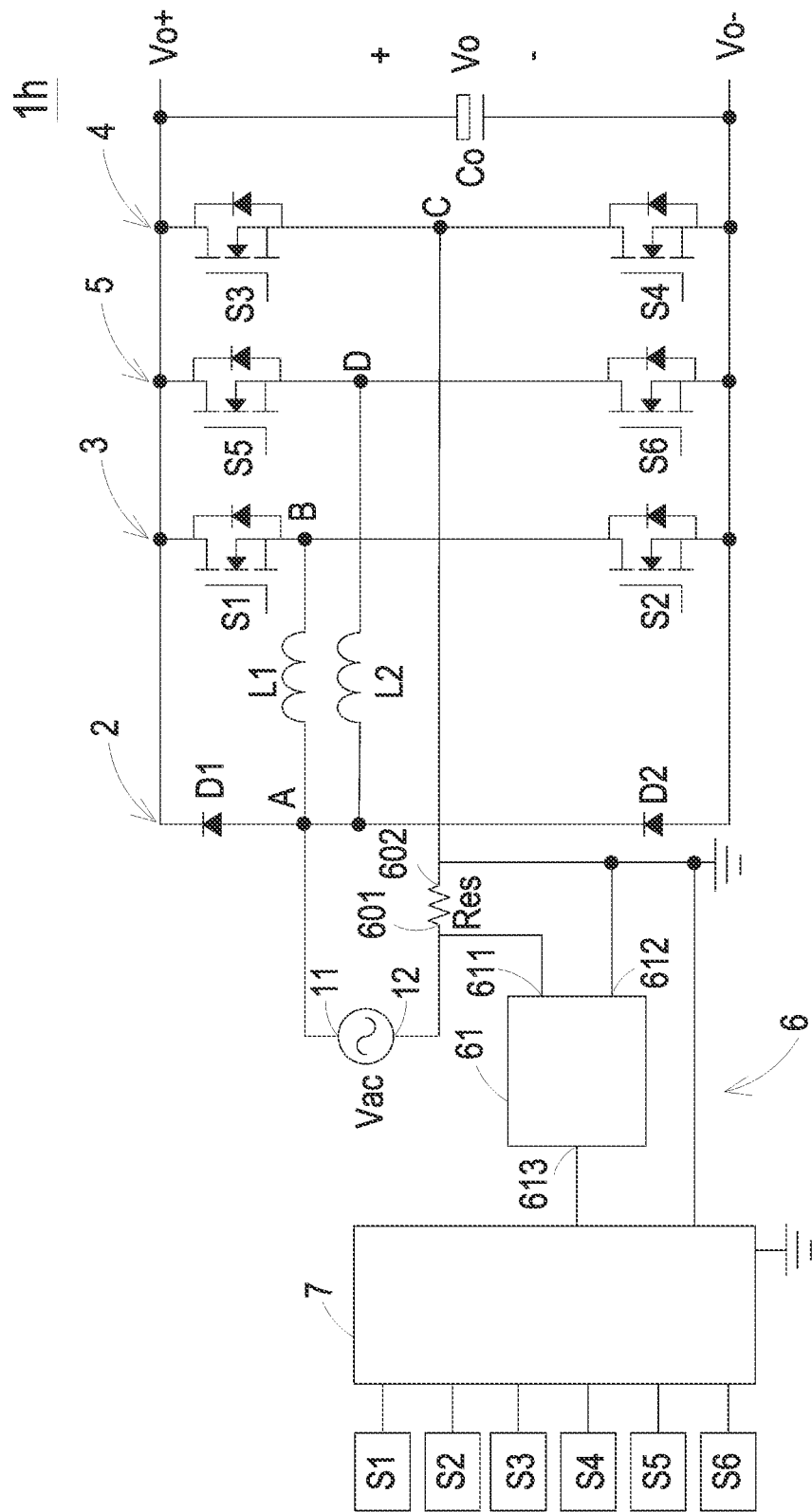
FIG. 11 is a schematic circuit diagram illustrating the circuitry topology of a totem pole power factor correction circuit according to a ninth embodiment of the present disclosure.

It is noted that the installation position of the detection module and the number of the switches in the totem pole power factor correction circuit may be adjusted according to the practical requirements. FIG. 11 is a schematic circuit diagram illustrating the circuitry topology of a totem pole power factor correction circuit according to a ninth embodiment of the present disclosure. The totem pole power factor correction circuit 1g as shown in FIG. 10 includes four switches (i.e., the first switch S1 and the second switch S2 of the second bridge arm 3 and the third switch S3 and the fourth switch S4 of the third bridge arm 4). In comparison with the totem pole power factor correction circuit 1g of FIG. 10, the totem pole power factor correction circuit 1h of this embodiment includes sixth switches. In addition to the first switch S1 and the second switch S2 of the second bridge arm 3 and the third switch S3 and the fourth switch S4 of the third bridge arm 4, the totem pole power factor correction circuit 1h of this embodiment further includes a fifth switch S5 and a sixth switch S6.

The fifth switch S5 and the sixth switch S6 are connected in series between the output positive terminal Vo+ and the output negative terminal Vo−. The fifth switch S5 and the sixth switch S6 are collaboratively formed as a fourth bridge arm 5. The fourth bridge arm 5, the first bridge arm 2, the second bridge arm 3 and the third bridge arm 4 are connected with each other in parallel. The connection point between the fifth switch S5 and the sixth switch S6 is a fourth node D. The fifth switch S5 and the sixth switch S6 are electrically connected with the control unit 7 through a driving module (not shown). For succinctness, the connecting relationship between the switches S5 and S6 and the control unit 7 is not shown. The on/off states of the fifth switch S5 and the sixth switch S6 are controlled by the control unit 7. The operations of the fifth switch S5 and the sixth switch S6 of the fourth bridge arm 5 are similar to the operations of the first switch S1 and the second switch S2 of the second bridge arm 3, and not redundantly described herein. In this embodiment, the fifth switch S5 and the sixth switch S6 are SiC switches, GaN switches or MOSFET switches.

The totem pole power factor correction circuit 1h of this embodiment further includes a second inductor L2. The second inductor L2 is electrically connected between the first terminal 11 of the input power source Vac and the fourth node D.

The detection circuit 61 in the totem pole power factor correction circuit 1h further includes an amplifier M, a first resistor R1, a second resistor R2, a third resistor R3 and a DC power supply $DC_{\_bias}$, a filtering resistor Rf, a filtering capacitor Cf, a Zener diode ZD, a first divider resistor R4 and a second divider resistor R5. The circuitry topology of these components is similar to the circuitry topologies as shown in FIGS. 4, 6 and 10A, and not redundantly described herein.

Figure 12:
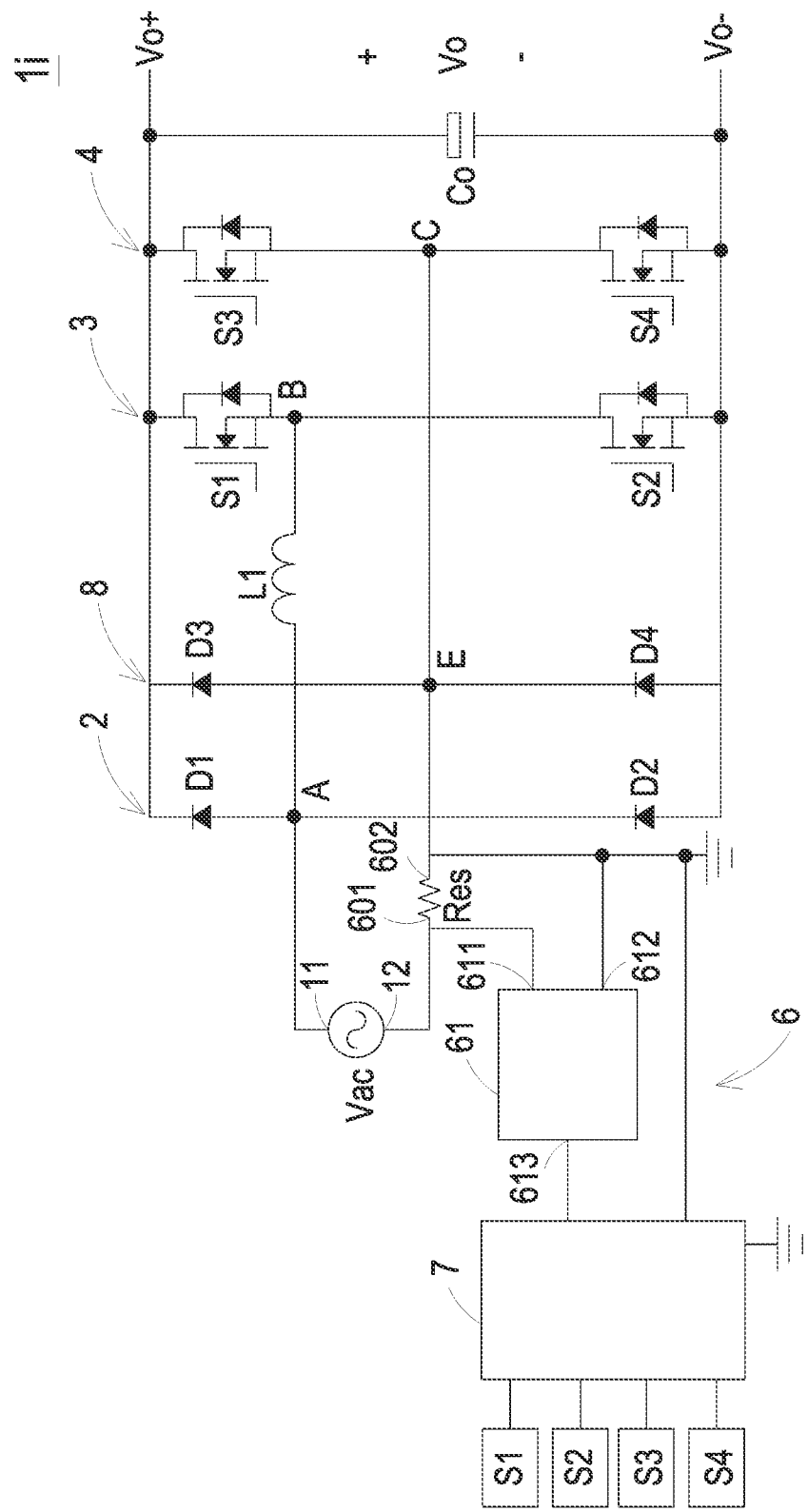
FIG. 12 is a schematic circuit diagram illustrating the circuitry topology of a totem pole power factor correction circuit according to a tenth embodiment of the present disclosure.

It is noted that the installation position of the detection module and the number of the bypass diodes in the totem pole power factor correction circuit may be adjusted according to the practical requirements. FIG. 12 is a schematic circuit diagram illustrating the circuitry topology of a totem pole power factor correction circuit according to a tenth embodiment of the present disclosure. The totem pole power factor correction circuit 1g as shown in FIG. 10 only includes two bypass diodes (i.e., the first bypass diode D11 and the second bypass diode D2 of the first bridge arm 2). In comparison with the totem pole power factor correction circuit 1g of FIG. 10, the totem pole power factor correction circuit 1i of this embodiment includes four bypass diodes. In addition to the first bypass diode D1 and the second bypass diode D2 of the first bridge arm 2, the totem pole power factor correction circuit 1i of this embodiment further includes a third bypass diode D3 and a fourth bypass diode D4. The third bypass diode D3 and the fourth bypass diode D4 are connected in series between the output positive terminal Vo+ and the output negative terminal Vo−. The third bypass diode D3 and the fourth bypass diode are collaboratively formed as a fifth bridge arm 8. The fifth bridge arm 8, the first bridge arm 2, the second bridge arm 3, the third bridge arm 4 are connected with each other in parallel. The connection point between the third bypass diode D3 and the fourth bypass diode D4 is a fifth node E. The fifth node E is electrically connected with the second terminal 602 of the detection resistor Res. That is, the fifth node E is electrically connected with the second terminal 12 of the input power source Vac through the detection resistor Res. By the first bypass diode D1 and the second bypass diode D2 of the first bridge arm 2 and the third bypass diode D3 and the fourth bypass D4 of the fifth bridge arm 8, the output capacitor Co is pre-charged before the totem pole power factor correction circuit 1i is enabled.

The detection circuit 61 in the totem pole power factor correction circuit 1i further includes an amplifier M, a first resistor R1, a second resistor R2, a third resistor R3 and a DC power supply $DC_{\_bias}$, a filtering resistor Rf, a filtering capacitor Cf, a Zener diode ZD, a first divider resistor R4 and a second divider resistor R5. The circuitry topology of these components is similar to the circuitry topologies as shown in FIGS. 4, 6 and 10A, and not redundantly described herein.

Figure 13:
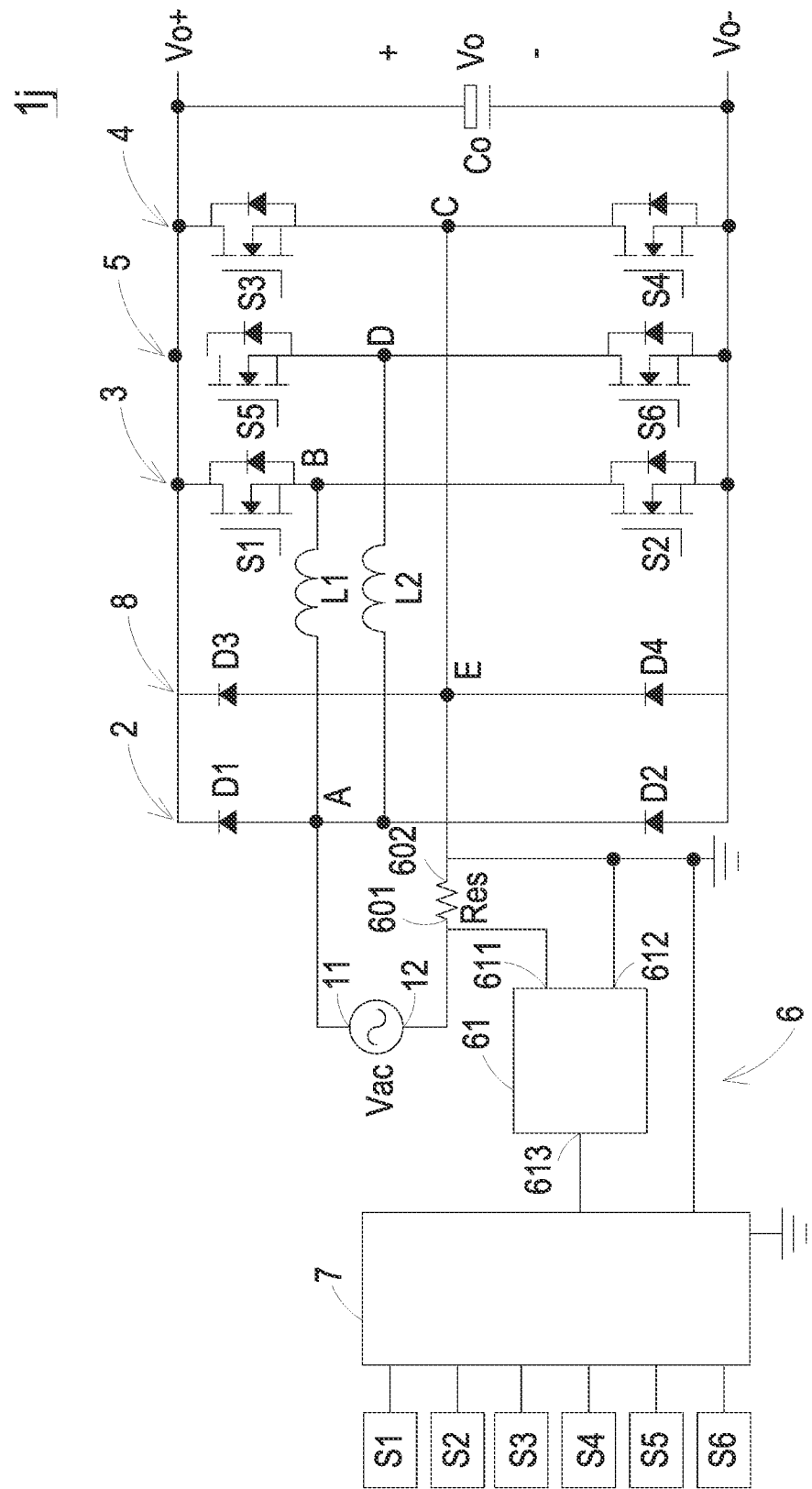
FIG. 13 is a schematic circuit diagram illustrating the circuitry topology of a totem pole power factor correction circuit according to an eleventh embodiment of the present disclosure.

It is noted that the installation position of the detection module, the number of the switches and the number of the bypass diodes in the totem pole power factor correction circuit may be adjusted according to the practical requirements. FIG. 13 is a schematic circuit diagram illustrating the circuitry topology of a totem pole power factor correction circuit according to an eleventh embodiment of the present disclosure. The totem pole power factor correction circuit 1h as shown in FIG. 11 only includes two bypass diodes (i.e., the first bypass diode D11 and the second bypass diode D2 of the first bridge arm 2). In comparison with the totem pole power factor correction circuit 1h of FIG. 11, the totem pole power factor correction circuit 1j of this embodiment includes four bypass diodes. In addition to the first bypass diode D1 and the second bypass diode D2 of the first bridge arm 2, the totem pole power factor correction circuit 1j of this embodiment further includes a third bypass diode D3 and a fourth bypass diode D4.

The third bypass diode D3 and the fourth bypass diode D4 are connected in series between the output positive terminal Vo+ and the output negative terminal Vo−. The third bypass diode D3 and the fourth bypass diode are collaboratively formed as a fifth bridge arm 8. The fifth bridge arm 8, the first bridge arm 2, the second bridge arm 3, the third bridge arm 4 and the fourth bridge arm 5 are connected with each other in parallel. The connection point between the third bypass diode D3 and the fourth bypass diode D4 is the fifth node E. The fifth node E is electrically connected with the second terminal 602 of the detection resistor Res. That is, the fifth node E is electrically connected with the second terminal 12 of the input power source Vac through the detection resistor Res. By the first bypass diode D1 and the second bypass diode D2 of the first bridge arm 2 and the third bypass diode D3 and the fourth bypass D4 of the fifth bridge arm 8, the output capacitor Co is pre-charged before the totem pole power factor correction circuit 1j is enabled.

The detection circuit 61 in the totem pole power factor correction circuit 1j further includes an amplifier M, a first resistor R1, a second resistor R2, a third resistor R3 and a DC power supply $DC_{\_bias}$, a filtering resistor Rf, a filtering capacitor Cf, a Zener diode ZD, a first divider resistor R4 and a second divider resistor R5. The circuitry topology of these components is similar to the circuitry topologies as shown in FIGS. 4, 6 and 10A, and not redundantly described herein.

From the above descriptions, the present disclosure provides the totem pole power factor correction circuit. The detection module in the totem pole power factor correction circuit includes the detection resistor and the detection circuit. If the output voltage outputted by the detection circuit is greater than or equal to the upper limit voltage threshold or lower than or equal to the lower limit voltage threshold, at least the third switch and the fourth switch are turned off under control of the control unit. In other words, the control unit determines whether the totem pole power factor correction circuit is in the normal working state according to the result of comparing the output voltage outputted by the detection circuit with the upper limit voltage threshold and the lower limit voltage threshold. If the output voltage outputted by the detection circuit is greater than or equal to the upper limit voltage threshold or lower than or equal to the lower limit voltage threshold, the control unit determines that the totem pole power factor correction circuit is in the abnormal state (e.g., in a short-circuited condition). When the totem pole power factor correction circuit is operated in the abnormal state, the corresponding switches will be turned off under control of the control unit. Consequently, the totem pole power factor correction circuit can be protected. If the switches are erroneously triggered or the polarity of the power supply is suddenly reversed because of unexpected situations (e.g., thunder) and the inconsistent control occurs due to time delay, the input power source is possibly in the short-circuited condition. If the output voltage outputted by the detection circuit is greater than or equal to the upper limit voltage threshold or lower than or equal to the lower limit voltage threshold, the corresponding switches in the totem pole power factor correction circuit are rapidly turned off under control of the control unit. Under this circumstance, the protecting measure can be taken immediately. Consequently, the possibility of causing damage of the totem pole power factor correction circuit will be minimized. In other words, the performance of the totem pole power factor correction circuit is enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A totem pole power factor correction circuit electrically coupled with an input power source and a load, the totem pole power factor correction circuit comprising:
   a first bridge arm comprising a first bypass diode and a second bypass diode connected in series, wherein a connection point between the first bypass diode and the second bypass diode is a first node;
   a second bridge arm connected with the first bridge arm in parallel, wherein the second bridge arm comprises a first switch and a second switch connected in series, and a connection point between the first switch and the second switch is a second node;
   a third bridge arm connected with the first bridge arm in parallel, wherein the third bridge arm comprises a third switch and a fourth switch connected in series, and a connection point between the third switch and the fourth switch is a third node, wherein the third node is electrically connected with a second terminal of the input power source;
   a first inductor electrically connected between a first terminal of the input power source and the second node;
   a detection module comprising a detection resistor and a detection circuit, wherein a first terminal of the detection resistor, the first node and a first terminal of the detection circuit are connected with each other, and a second terminal of the detection resistor, the first terminal of the input power source and a second terminal of the detection circuit are connected with each other, wherein a voltage difference between two terminals of the detection resistor is detected by the detection circuit and an output voltage is outputted from a third terminal of the detection circuit; and
   a control unit electrically coupled with the third terminal of the detection circuit, and controlling the first switch, the second switch, the third switch and the fourth switch, wherein when the control unit confirms that the output voltage outputted by the detection circuit is greater than or equal to an upper limit voltage threshold or the output voltage outputted by the detection circuit is smaller than or equal to a lower limit voltage threshold, at least the third switch and the fourth switch are turned off under control of the control unit.

2. The totem pole power factor correction circuit according to claim 1, wherein the detection circuit comprises an amplifier, a first resistor, a second resistor, a third resistor and a DC power supply, wherein an output terminal of the amplifier is electrically coupled with the third terminal of the detection circuit, the first resistor is electrically connected between a negative input terminal of the amplifier and the first terminal of the detection circuit, the second resistor is electrically connected between a positive input terminal of the amplifier and the second terminal of the detection circuit, the third resistor is electrically connected between the negative input terminal of the amplifier and the output terminal of the amplifier, a positive terminal of the DC power supply is electrically coupled with the positive input terminal of the amplifier, and a negative terminal of the DC power supply is electrically connected with the second terminal of the detection circuit and a ground terminal.

3. The totem pole power factor correction circuit according to claim 2, wherein the detection circuit further comprises a filtering resistor and a filtering capacitor, wherein the filtering resistor is electrically connected between the output terminal of the amplifier and the third terminal of the detection circuit, and the filtering capacitor is electrically connected between the filtering resistor and the second terminal of the detection circuit.

4. The totem pole power factor correction circuit according to claim 3, wherein the detection circuit further comprises a Zener diode, wherein an anode of the Zener diode is electrically connected with the second terminal of the detection circuit, and a cathode of the Zener diode is electrically connected with the third terminal of the detection circuit.

5. The totem pole power factor correction circuit according to claim 2, wherein the detection circuit further comprises a first divider resistor and a second divider resistor, wherein the first divider resistor is electrically connected between the positive input terminal of the amplifier and the positive terminal of the DC power supply, and the second divider resistor is electrically connected between the positive input terminal of the amplifier and the second terminal of the detection circuit.

6. The totem pole power factor correction circuit according to claim 1, wherein the totem pole power factor correction circuit further comprises a fifth bridge arm, and the fifth bridge arm comprises a third bypass diode and a fourth bypass diode connected in series, wherein a connection point between the third bypass diode and the fourth bypass diode is a fifth node, and the fifth node is connected with the second terminal of the input power source.

7. The totem pole power factor correction circuit according to claim 1, wherein the totem pole power factor correction circuit further comprises a fourth bridge arm and a second inductor, wherein the fourth bridge arm is connected with the first bridge arm in parallel, and the fourth bridge arm comprises a fifth switch and a sixth switch connected in series, wherein a connection point between the fifth switch and the sixth switch is a fourth node, and the second inductor is electrically connected between the first terminal of the input power source and the fourth node.

8. The totem pole power factor correction circuit according to claim 7, wherein the totem pole power factor correction circuit further comprises a fifth bridge arm, and the fifth bridge arm comprises a third bypass diode and a fourth bypass diode connected in series, wherein a connection point between the third bypass diode and the fourth bypass diode is a fifth node, and the fifth node is connected with the second terminal of the input power source.

9. The totem pole power factor correction circuit according to claim 1, wherein when an input AC power of the input power source is in a positive half-cycle, the first inductor is in a charging mode and the control unit confirms that the output voltage outputted by the detection circuit is lower than the upper limit voltage threshold and greater than the lower limit voltage threshold, the second switch and the fourth switch are turned on and the first switch and the third switch are turned off under control of the control unit.

10. The totem pole power factor correction circuit according to claim 1, wherein when an input AC power of the input power source is in a positive half-cycle, the first inductor is in a discharging mode and the control unit confirms that the output voltage outputted by the detection circuit is lower than the upper limit voltage threshold and greater than the lower limit voltage threshold, the first switch and the fourth switch are turned on and the second switch and the third switch are turned off under control of the control unit.

11. The totem pole power factor correction circuit according to claim 1, wherein when an input AC power of the input power source is in a negative half-cycle, the first inductor is in a charging mode and the control unit confirms that the output voltage outputted by the detection circuit is lower than the upper limit voltage threshold and greater than the lower limit voltage threshold, the first switch and the third switch are turned on and the second switch and the fourth switch are turned off under control of the control unit.

12. The totem pole power factor correction circuit according to claim 1, wherein when an input AC power of the input power source is in a negative half-cycle, the first inductor is in a discharging mode and the control unit confirms that the output voltage outputted by the detection circuit is lower than the upper limit voltage threshold and greater than the lower limit voltage threshold, the second switch and the third switch are turned on and the first switch and the fourth switch are turned off under control of the control unit.

13. The totem pole power factor correction circuit according to claim 1, wherein when the control unit confirms that the output voltage outputted by the detection circuit is greater than or equal to an upper limit voltage threshold or the output voltage outputted by the detection circuit is smaller than or equal to a lower limit voltage threshold, the first switch, the second switch, the third switch and the fourth switch are turned off under control of the control unit.

\* \* \* \* \*